(12) United States Patent
Doi et al.

(10) Patent No.: US 8,081,651 B2
(45) Date of Patent: *Dec. 20, 2011

(54) RADIO COMMUNICATION METHOD AND RADIO COMMUNICATION DEVICE

(75) Inventors: Hiroshi Doi, Kanagawa (JP); Yoshinori Watanabe, Tokyo (JP); Masahiro Mimura, Tokyo (JP)

(73) Assignee: Panasonic Corporation, Osaka (JP)

( * ) Notice: Subject to any disclaimer, the term of this patent is extended or adjusted under 35 U.S.C. 154(b) by 100 days.

This patent is subject to a terminal disclaimer.

(21) Appl. No.: 12/561,710

(22) Filed: Sep. 17, 2009

(65) Prior Publication Data

US 2010/0008334 A1  Jan. 14, 2010

Related U.S. Application Data

(63) Continuation of application No. 10/574,595, filed on Apr. 5, 2006, now Pat. No. 7,613,202.

(30) Foreign Application Priority Data

May 31, 2004 (JP) .................................. 2004-161052
May 20, 2005 (JP) .................................. 2005-147887

(51) Int. Cl.
  *H04B 7/12*  (2006.01)
(52) U.S. Cl. ........................................ 370/443; 455/509
(58) Field of Classification Search .................. 455/450; 370/376
See application file for complete search history.

(56) References Cited

U.S. PATENT DOCUMENTS

| | | | |
|---|---|---|---|
| 6,768,730 B1 | 7/2004 | Whitehill | |
| 6,778,586 B1 | 8/2004 | Mano | |
| 7,103,371 B1 | 9/2006 | Liu | |
| 2003/0103520 A1* | 6/2003 | Chen et al. | 370/444 |
| 2004/0053621 A1 | 3/2004 | Sugaya | |

FOREIGN PATENT DOCUMENTS

| | | |
|---|---|---|
| JP | 09-064888 A | 3/1997 |
| JP | 9-64888 A | 3/1997 |
| JP | 2002-223479 A | 8/2002 |
| JP | 2003-229869 A | 8/2003 |
| JP | 2004-040373 A | 2/2004 |
| JP | 2004-40373 A | 2/2004 |

OTHER PUBLICATIONS

JP Office Action for 2005-147887 Nov. 30, 2010.
International Search Report for PCT/JP2005/009848 Aug. 23, 2005.
JP Office Action for Application No. 2005-147886 Feb. 24, 2011.

* cited by examiner

*Primary Examiner* — Marcos Batista
(74) *Attorney, Agent, or Firm* — RatnerPrestia

(57) ABSTRACT

A radio communication device includes a communication data selection unit for selecting from the received radio communication data containing communication time reservation request information in which a time slot for performing data transmission source radio communication device is described and a communication information analysis unit for extracting an identifier of the source radio communication device and the data transmission reservation time slot from the communication time reservation request information in the radio communication data. When the received radio communication data is addressed to the local device, a communication/response information generation unit correlates the identifier to the reservation time slot, records them in a communication reservation table, and generates communication time reservation response information including information of the reservation time slot.

24 Claims, 19 Drawing Sheets

FIG.8

| SOURCE ID | DESTINATION ID | START TIME OF USE | TRANSMISSION OCCUPIED TIME | FRAME ID | RECEPTION CHANNEL ID |
|---|---|---|---|---|---|
| 24b4d7458a26 | 7814d72ef139 | 12 | 79 | 0006 | 1 |

| SOURCE ID | DESTINATION ID | START TIME OF USE | TRANSMISSION OCCUPIED TIME | FRAME ID | RESPONSE |
|---|---|---|---|---|---|
| 51b4e821a6f4 | 75a4c143df45 | 07 | 69 | 0014 | 0 |

901, 902, 903, 904, 905, 906

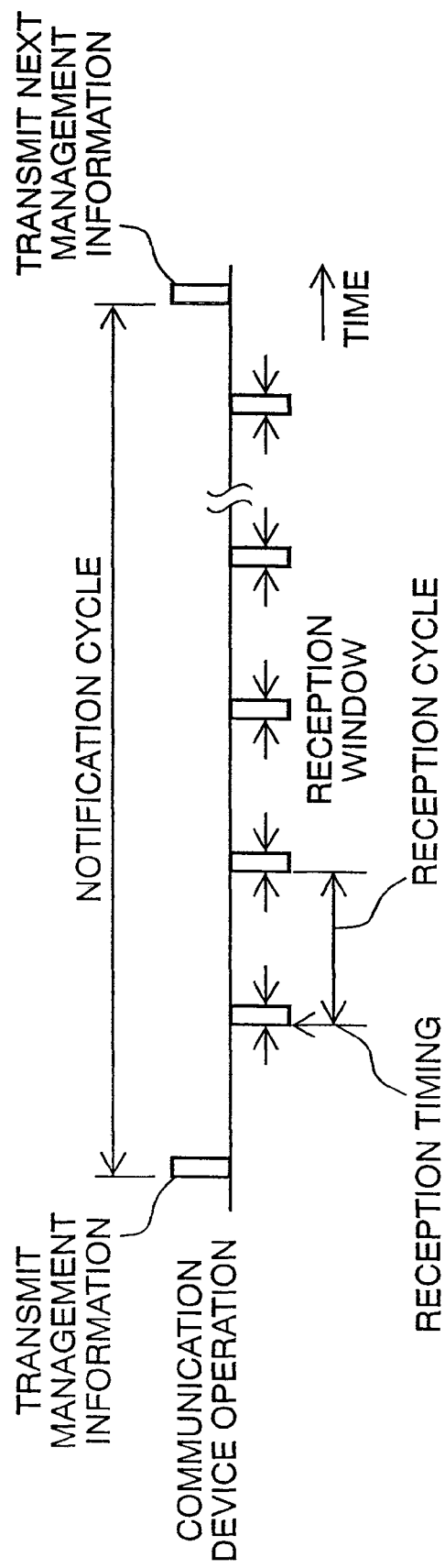

RADIO COMMUNICATION METHOD AND RADIO COMMUNICATION DEVICE

This application is a continuation of U.S. patent application Ser. No. 10/574,595, the contents of which are incorporated herein by reference.

TECHNICAL FIELD

The present invention relates to a radio communication method and a radio communication device when performing ad hoc communication in a radio communication network.

BACKGROUND ART

Conventional radio communication methods and radio communication devices for performing ad hoc communication include those disclosed in JP-A-2003-229869. FIG. 20 shows a radio communication method described in JP-A-2003-229869.

In FIG. 20, a radio communication device sets a notification cycle of management information at a predetermined time interval and transmits management information in which reception timing information indicating a start position for receiving it own information, reception window information, and reception cycle information are written. Another radio communication device which could receive the management information associates it with a communication device number of the applicable radio communication device and stores the reception timing, the reception window and the reception cycle. When transmitting information, the reception start position of the correspondent communication device is found from the reception timing, the reception window and the reception cycle of the correspondent node, and information is sent at the timing.

However, in the above conventional method, a reception window for receiving transmission requests is designated, and therefore there is a problem that transmission requests from plural radio communication devices are concentrated in the reception window and the possibility that the device cannot correctly receive the transmission request may increase.

Also, since communication requests or communication responses which are not addressed to the device do not coincide with its reception window, it cannot receive them. Therefore, there is a problem that the device cannot know time slots of the extended reception windows in which other radio communication devices receive data, and as a result, possibility that the device transmits data at such time slots may increase.

DISCLOSURE OF THE INVENTION

An object of the invention is to provide a radio communication method and a radio communication device which can avoid communication collision with other radio communication devices.

A radio communication method of the invention includes a step in which a first radio communication device sends communication time reservation request information which is addressed to a second radio communication device, and in which a time slot when transmitting data to the second radio communication device is written, to the second radio communication device, a step in which the second radio communication device sends communication time reservation response information in which notification of the reception of the communication time reservation request information is added to the communication time reservation request information, a step in which a third radio communication device which has received the communication time reservation request information from the first radio communication device or the communication time reservation response information from the second radio communication device or both stores the time slot written in the communication time reservation request information or the communication time reservation response information as a transmission prohibited time slot, and a step in which the third radio communication device decides a time slot in which its own transmission and reception are possible based on the stored transmission prohibited time slots.

According to this, the first radio communication device or the second radio communication device does not receive interfering radio waves from the third radio communication device during data communication, and therefore the second radio communication device can receive data from the first radio communication device correctly.

In the radio communication method of the invention, the third radio communication device prohibits transmission in all time slots written in the stored communication time reservation request information or the communication time reservation response information.

According to this, when the third radio communication device performs data communication, it avoids communication time slots received from plural first radio communication devices or plural second radio communication devices, and therefore the second radio communication device can receive data correctly without interference even when there are plural first radio communication devices and plural second radio communication devices.

The time slot in the radio communication method of the invention is notified by giving the data-transmission start time and the data-transmission dedicated time.

In this way, the third radio communication device can learn the period of time from the start until the end of data communication from the first radio communication device or the second radio communication device, and therefore the device can avoid its data communication during this communication period. Accordingly, the second radio communication device can receive data from the first radio communication device throughout the communication period.

In the radio communication method of the invention, the first radio communication device transmits a communication request signal RTS including communication time reservation request information and the second radio communication device transmits a communication confirmation signal CTS including communication time reservation response information.

Accordingly, the start time of data communication can be set arbitrarily.

In the radio communication method of the invention, the communication time reservation request information and the communication time reservation response information further include information of a channel used for communication, in which even when the time slot of transmitting data registered in the communication prohibition table is the same, in the case that the channel whereby the first radio communication device performs transmission is different from information of the communication prohibition table, the request of communication time reservation and the data transmission are possible.

In this way, multi-channel communication in the same area and the same time is possible.

The radio communication method of the invention further includes a step in which the first radio communication device transmits data to the second radio communication device in the time slot of which the second radio communication device has been notified, a step in which the second radio communication device detects collisions while receiving data, a step in which the second radio communication device notifies the collision to the first radio communication device when the number of times of collisions is more than or equal to a prescribed number of times, and a step in which the first radio communication device, when receiving the notification of collision, transmits communication time reservation request information addressed to the second radio communication device, in which the time slot for transmitting data is set to be a time slot different from the previous one.

According to this, even when a collision occurs, the first radio communication device designates a different time slot and transmits data again, so that the second radio communication device can acquire data without fail.

The radio communication method of the invention further includes a step in which the first radio communication device transmits data in the time slot which has been notified to the second radio communication device, a step in which the second radio communication device detects collisions while receiving data, a step in which the second radio communication device notifies to the first radio communication device of the collisions when the number of times of collisions per unit time is more than or equal to the prescribed number of times, a step in which when the first radio communication device receives the notification of collisions, it requests the second radio communication device to specify a time slot in which transmission is prohibited or a time slot in which transmission is permitted, a step in which the second radio communication device, when receiving the request, transmits the transmission prohibited time slot or the transmission-permitted time slot to the first radio communication device and a step in which the first radio communication device selects a time slot which satisfies the conditions prescribed by the transmission prohibited time slot or the transmission-permitted time slot received from the second radio communication device, and notifies the time slot to the second radio communication device as communication time reservation request information.

According to this, the first radio communication device can know the time slot when the second radio communication device can receive signals without interference, and therefore the first radio communication device can set the time slot when the second radio communication device can receive signals without fail, thereby performing transmission.

The radio communication method of the invention further includes a step in which when the first radio communication device transmits the communication time reservation request information to the second radio communication device, the second radio communication device detects that the information overlaps with communication time reservation request information of another radio communication device which has been received as a third radio communication device, a step in which when the second radio communication device detects a collision, it adds information indicating the overlap to the communication time reservation response information, a step in which the first radio communication device transmits data to the second radio communication device, a step in which when the first radio communication device has detected the above information indicating the overlap, it detects the collision by confirming that a response to the data has not returned, a step in which the first radio communication device, when the number of times of collisions per unit time is more than or equal to the prescribed number of times, inquires of the second radio communication device as to the time when the first radio communication device does not collide, and a step in which the first radio communication device transmits communication time reservation response information in accordance with the notification of the collision-free time slot given in response to the inquiry by the second radio communication device.

Also according to this, the first radio communication device can know the time slot in which the second radio communication device can receive without interference, and therefore the first radio communication device can perform transmission by setting the time slot when the second radio communication device can receive signals without fail.

The radio communication method of the invention further includes a step in which when the transmission prohibited time slot decided based on the communication time reservation request information or communication time reservation response information or both which are not addressed to the second radio communication device overlaps with a time slot in which communication addressed to the second radio communication device is reserved, from that time onward, the second radio communication device forwards communication time reservation request information and communication time reservation response information not addressed to the second radio communication device which are received to radio communication devices in the transmittable area.

The radio communication method of the invention further includes a step in which the first radio communication device transmits data in the time slot which has been notified to the second radio communication device, a step in which the second radio communication device detects collisions while receiving data, a step in which the second radio communication device notifies the first radio communication device as to the collision and as to a transmission prohibited time slot or a transmission-permitted time slot, and a step in which when the first radio communication device receives the collision notification, it selects a time slot which satisfies the prescribed conditions of the transmission prohibited time slot or the transmission-permitted time slot received from the second radio communication device and notifies the second radio communication device as to the time slot in the form of communication time reservation request information.

According to this, the first radio communication device can know the time slot when the second radio communication device can receive signals without interference, and therefore the first radio communication device can set a time slot when the second radio communication device can receive signals without fail and thereby perform transmission.

In the radio communication method of the invention, the second radio communication device detects the collision by the fact that data has not been received in the time slot when the transmission prohibited time slot calculated based on the received communication time reservation request information or communication time reservation response information or both which are not addressed to the second radio communication device overlaps the time slot of communication reservation addressed to the second radio communication device.

According to this, the second radio communication device can detect a collision with the data transmission reservation time slot.

In the radio communication method of the invention, when the number of detected collisions is less than the prescribed number, the second radio communication device stops notifying its transmission prohibited time slot or its transmission-permitted time slot to the first radio communication device.

In the radio communication method of the invention, when the ratio between the transmission prohibited time slot and the transmission-permitted time slot is less than or equal to the prescribed value, the second radio communication device stops notifying the transmission prohibited time slot or the transmission-permitted time slot to the first radio communication device.

According to these, if the collision frequency is decreased, that communication is substantially possible, and the notification from the second radio communication device is not performed, so that communication can be performed without changing the time for data transmission.

A radio communication device of the invention includes a receiving unit receiving radio communication data, a communication data identification unit identifying from the received radio communication data the radio communication data which includes communication time reservation request information in which a time slot when a source radio communication device will transmit data is written, a communication information analysis unit extracting an identifier of the source radio communication device and the data transmission reservation time slot from the communication time reservation request information of the identified radio communication data, a communication reservation table in which the communication information analysis unit records the identifier and reservation time slot, associating them with one another, when the destination of the data is the receiving radio communication device, a communication/response information generation unit generating communication time reservation response information in which information notifying that there will be proper communication is added to the communication time reservation request information, and a transmitting unit transmitting the generated communication time reservation response information.

According to this, the response including reserved communication time information is transmitted, and therefore the use of the time slot can be notified to a radio communication device which has made the communication request and radio communication devices in a transmittable area.

The radio communication device of the invention further includes a communication prohibition table in which the communication information analysis unit records the identifier, the reservation time slot and the destination of radio communication data, associating them with one another, when the destination of radio communication data is not the receiving radio communication device, in which the response information generation unit generates communication time reservation response information to which notice of communication prohibition is added when the received radio communication data addressed to the receiving radio communication device contains reservation of communication in a time slot which overlaps with a time slot recorded in the communication prohibition table.

According to this, transmission is performed avoiding the time slot in which communication is reserved, and therefore communication can be performed without interference.

The radio communication device of the invention further includes a communication data generation unit generating transmission data addressed to another radio communication device and a communication information generation unit generating communication time reservation request information including a transmission time slot, deciding upon a time slot other than those recorded in the communication prohibition table as the transmission time slot for transmission of data generated by the communication data generation unit, and the transmitting unit transmits the communication time reservation request information to a destination radio communication device.

According to this, a time slot where no interference will be received can be reserved for transmission.

The radio communication device further includes an event timer, which receives the notification of the transmission time from the communication information generation unit, and gives notice to the communication data generation unit that the transmission time has expired, and a communication data generation unit, which when it receives this notification generates communication data and transmits the data to the destination radio communication device.

According to this, transmission can be started at the reserved time.

In the radio communication device, the communication time reservation request information and the communication time reservation response information further include information of the channel to be used for communication, and even if the time slot of data transmission recorded in the communication prohibition table by the communication information analysis unit overlaps the requested time, the request of communication time reservation and data transmission are possible when the channel whereby the first radio communication device performs transmission is different from information of the communication prohibition table.

According to this, only the time slot which affects the channel used by that radio communication device and which is reserved by another radio communication device is recorded, and therefore the communication channel of itself can be used efficiently.

According to the invention, plural radio communication devices can perform radio communication without interfering with one another.

BRIEF DESCRIPTION OF THE DRAWINGS

FIG. 8 is a table showing a communication prohibition table according to the embodiment 1 of the invention.

FIG. 9 is table showing a communication reservation table according to the embodiment 1 of the invention.

FIG. 20 is a view showing a radio communication method in a conventional example.

DESCRIPTION OF REFERENCE NUMERALS

Figure 1:
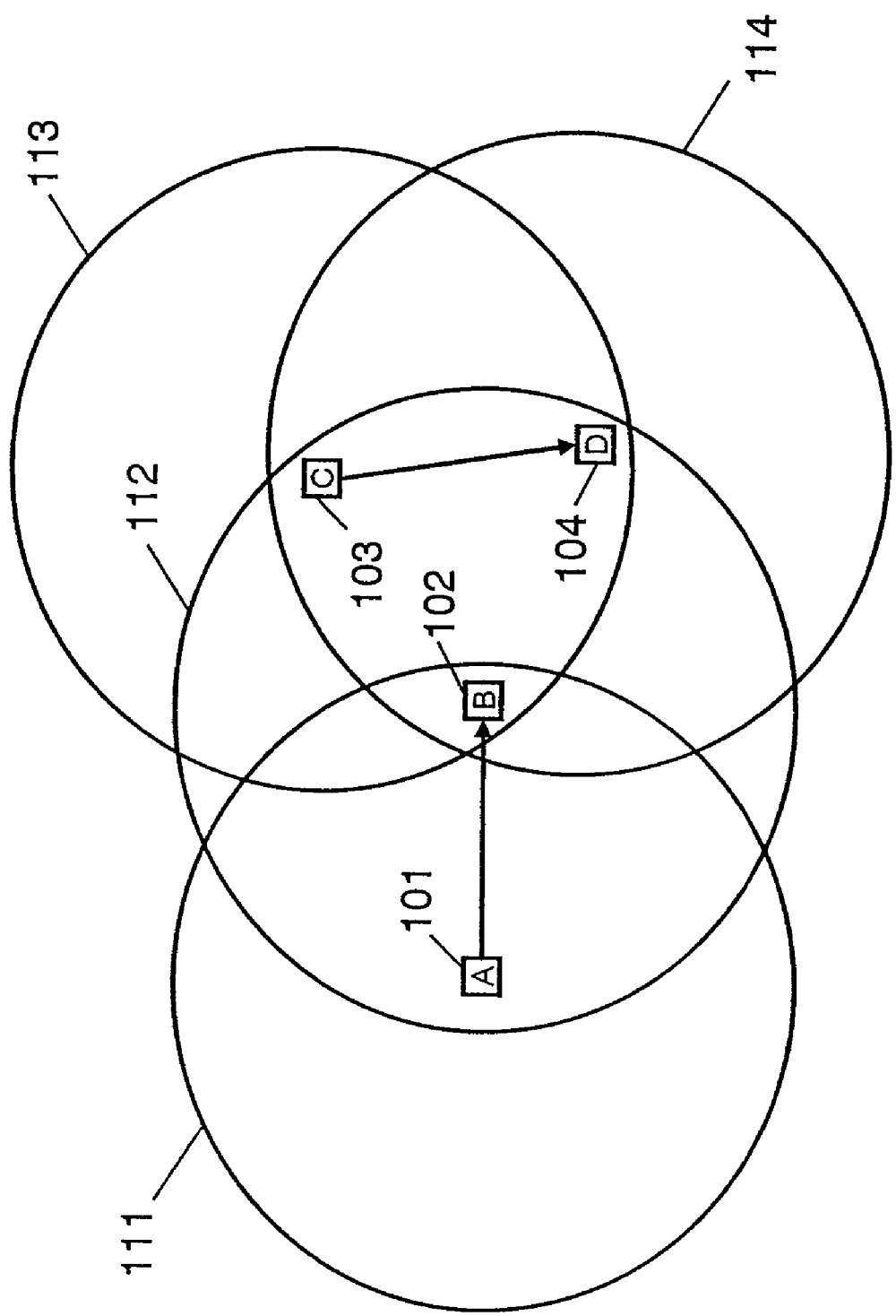
FIG. 1 is a view showing a configuration of a radio communication network according to an embodiment 1 of the invention.

101, 102, 103, 104 radio communication device
111, 112, 113, 114 communicable area
200 antenna
201 receiving unit
202 communication data identification unit
203 application unit
204 communication information analysis unit
205 communication prohibition table
206 communication reservation table
207 communication/response information generation unit
209 event timer
210 communication data generation unit
211 transmitting unit
1401 narrowband transmitting unit
1402 narrowband receiving unit
1501 collision counter
1502 nCTS counter

BEST MODE FOR CARRYING OUT THE INVENTION

Hereinafter, embodiments of the invention will be explained with reference to the drawings.

Embodiment 1

FIG. 1 is a view showing a configuration of a radio communication network according to embodiments of the invention.

In FIG. 1, radio communication devices 101 to 104 perform a multi-access system Ultra Wide Band (UWB) radio communication with other radio communication devices in communicable areas 111 to 114, transmitting data to the whole communicable area by a non-directional antenna. The radio communication devices 101 to 104 can freely move in space.

Figure 2:
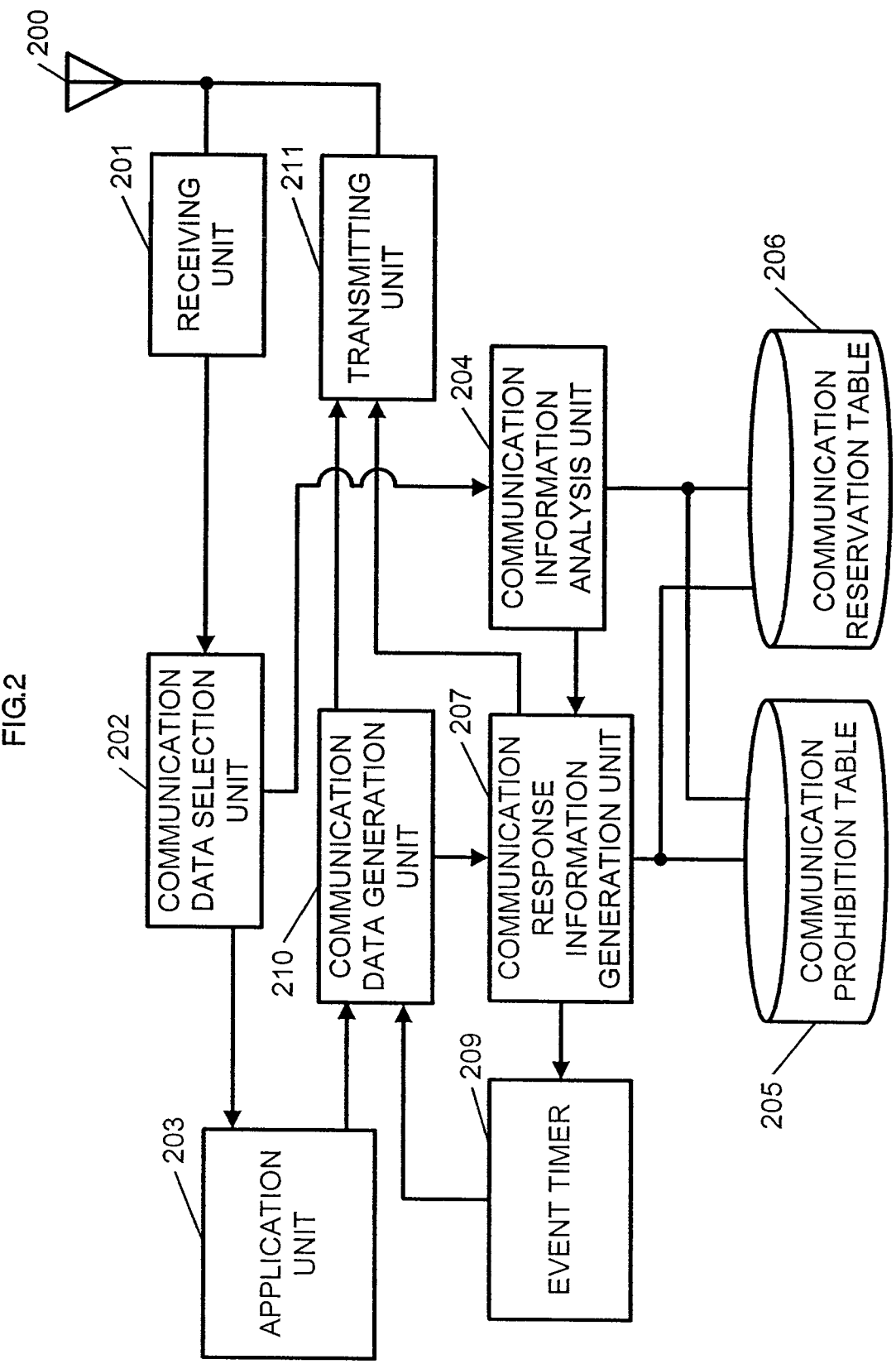
FIG. 2 is a diagram showing a configuration of a radio communication device according to the embodiment 1 of the invention.

FIG. 2 is a block diagram showing a configuration of the radio communication devices 101 to 104.

In FIG. 2, a receiving unit 201 converts analog signals received from an antenna 200 into digital signals to generate frames, and always is in a receivable state. A transmitting unit 211 converts digital signal frames into analog signals and transmits the signals from the antenna 200. The antenna 200 is a non-directional antenna, and radiates radio waves in the communicable area.

A communication data selection unit 202 identifies the type of the frame received by the receiving unit 201 from the antenna 200. Frame types include a communication request RTS frame (hereinafter, referred to as an "RTS frame"), a communication confirmation signal CTS (hereinafter, referred to as a "CTS frame"), a communication non-confirmed signal nCTS (hereinafter, referred to as an "nCTS frame"), a data frame, and a Keep Alive frame.

Here, each frame will be explained.

Figure 3:
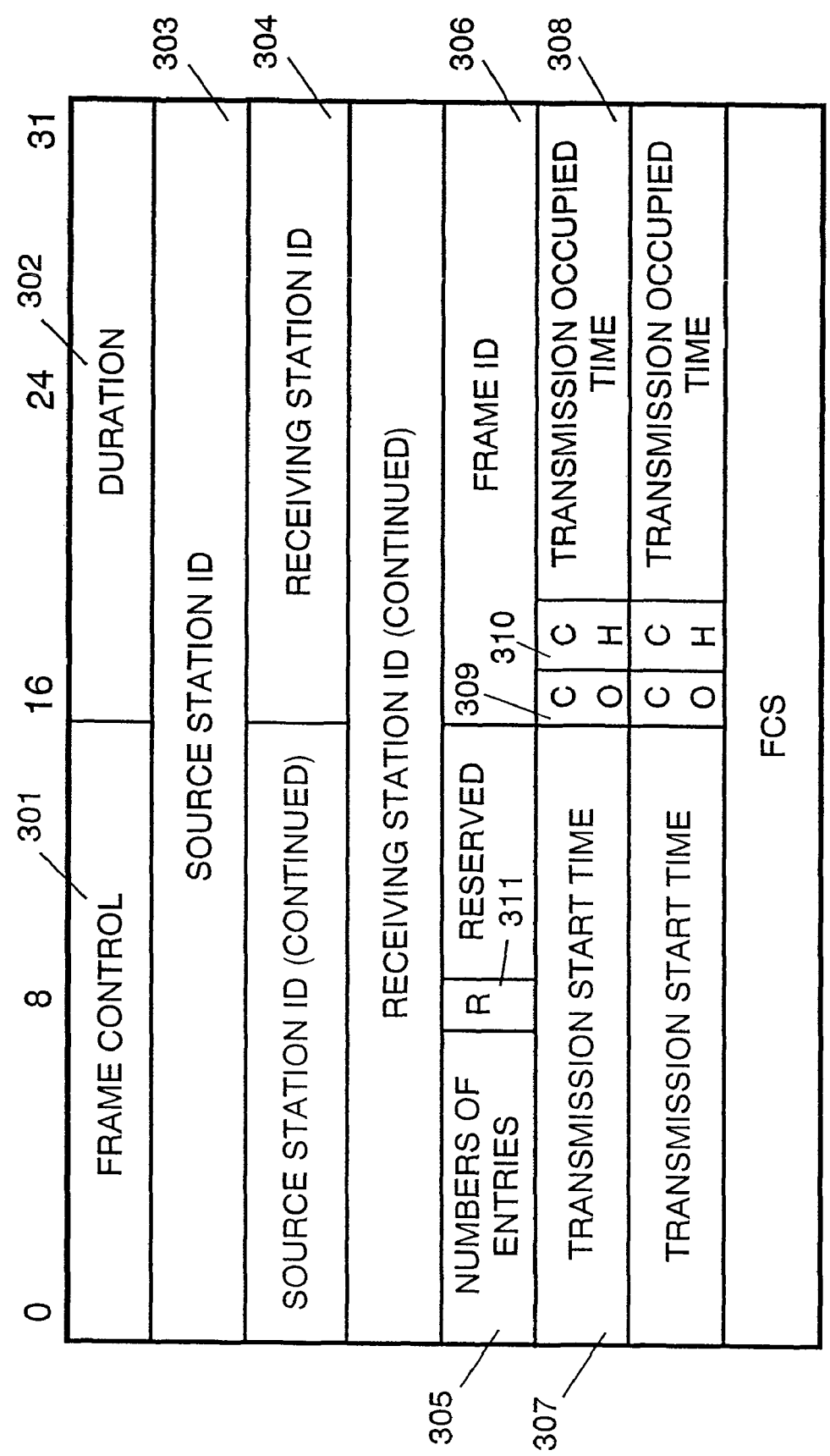
FIG. 3 is a table showing an RTS frame format according to the embodiment 1 of the invention.

FIG. 3 shows a RTS frame format.

In FIG. 3, a frame control 301 is identification information of a frame, and a unique code for the RTS frame is set therein. Duration 302 indicates the permissible time in which reception of the CTS frame as a response frame for the RTS frame is accepted. Source station ID 303 identifies the source radio communication device, and the MAC address is set therein. Receiving station ID 304 identifies the transmission destination, and the MAC address of the destination radio communication device is set therein. Number of entries 305 indicates the number of a data transmission time slots to be reserved, and a frame ID 306 identifies the RTS frame.

Transmission start time 307 and transmission occupied time 308 respectively indicate the time from a point of CTS reception until the start of transmission of a data frame, and the time dedicated to communication. A collision (CO) bit 309 indicates a collision; however, it is not used in the RTS frame. A channel number (CH) 310 designates the channel used for communication of the data frame.

Figure 4:
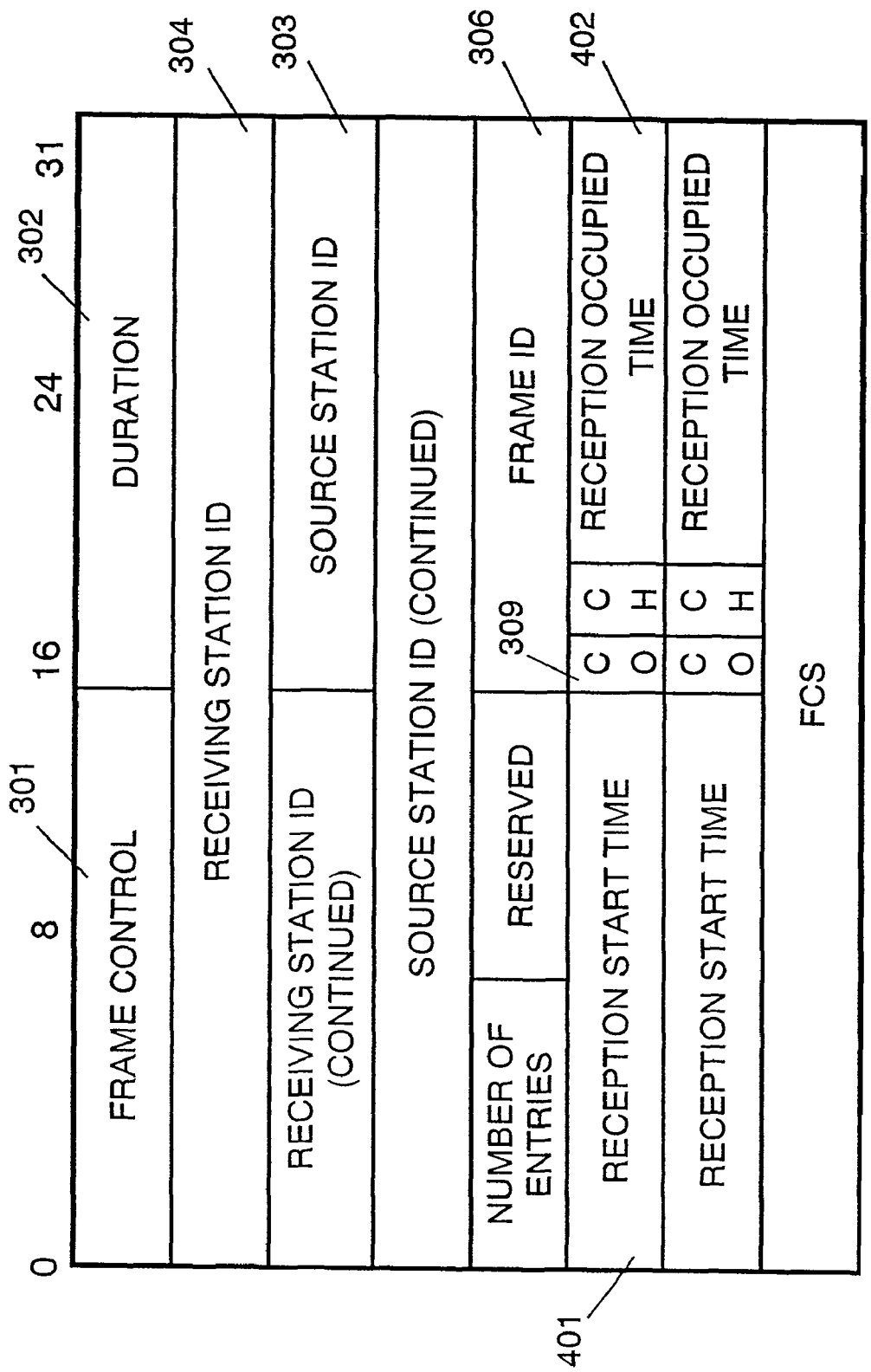
FIG. 4 is a table showing a CTS frame format according to the embodiment 1 of the invention.

FIG. 4 shows a frame format of a CTS frame and an nCTS frame.

In FIG. 4, in the case of the CTS frame, reception start time 401 and reception dedicated time 402 indicate the time until the start of transmission of the data frame notified by the RTS frame and the time dedicated to the transmission. In the case of the nCTS frame, they indicate the time from the time of transmission of CTS which permits reception designated by the receiving radio communication device until the start of reception of the data frame, and the time occupied by the reception.

In the case of the CTS frame, the collision bit (CO) 309 indicates that there is an time slot overlap of a communication-prohibited time slot acquired from other radio communication devices and a time slot of communication reservation designated by the RTS frame, but the collision bit is not used in the case of the nCTS frame.

The frame ID 306 identifies the received RTS frame to which a response is to be made. For the frame control 301, different identifying codes are used respectively in the CTS frame and nCTS frame.

Figure 5:
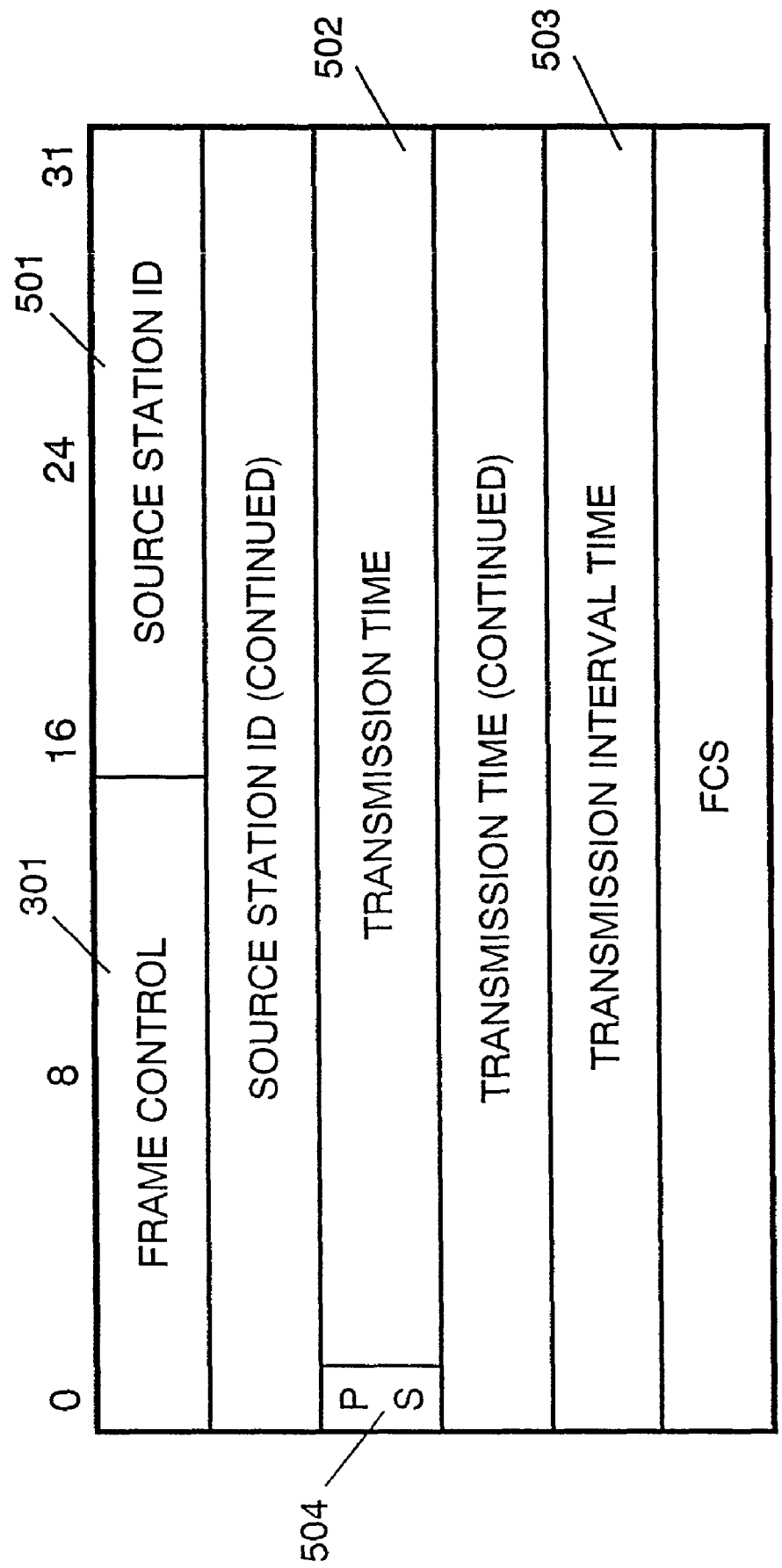
FIG. 5 is a table showing a Keep Alive frame format according to the embodiment 1 of the invention.

FIG. 5 shows a format of a Keep Alive frame.

In FIG. 5, a code for identifying the Keep Alive frame is set in the frame control 301. Source station ID 501 is an identifier which identifies a source radio communication device, and a MAC address is set therein. Transmission time 502 indicates the transmission time of the frame, and a transmission interval time 503 indicates the cycle of frame transmission.

Figure 6:
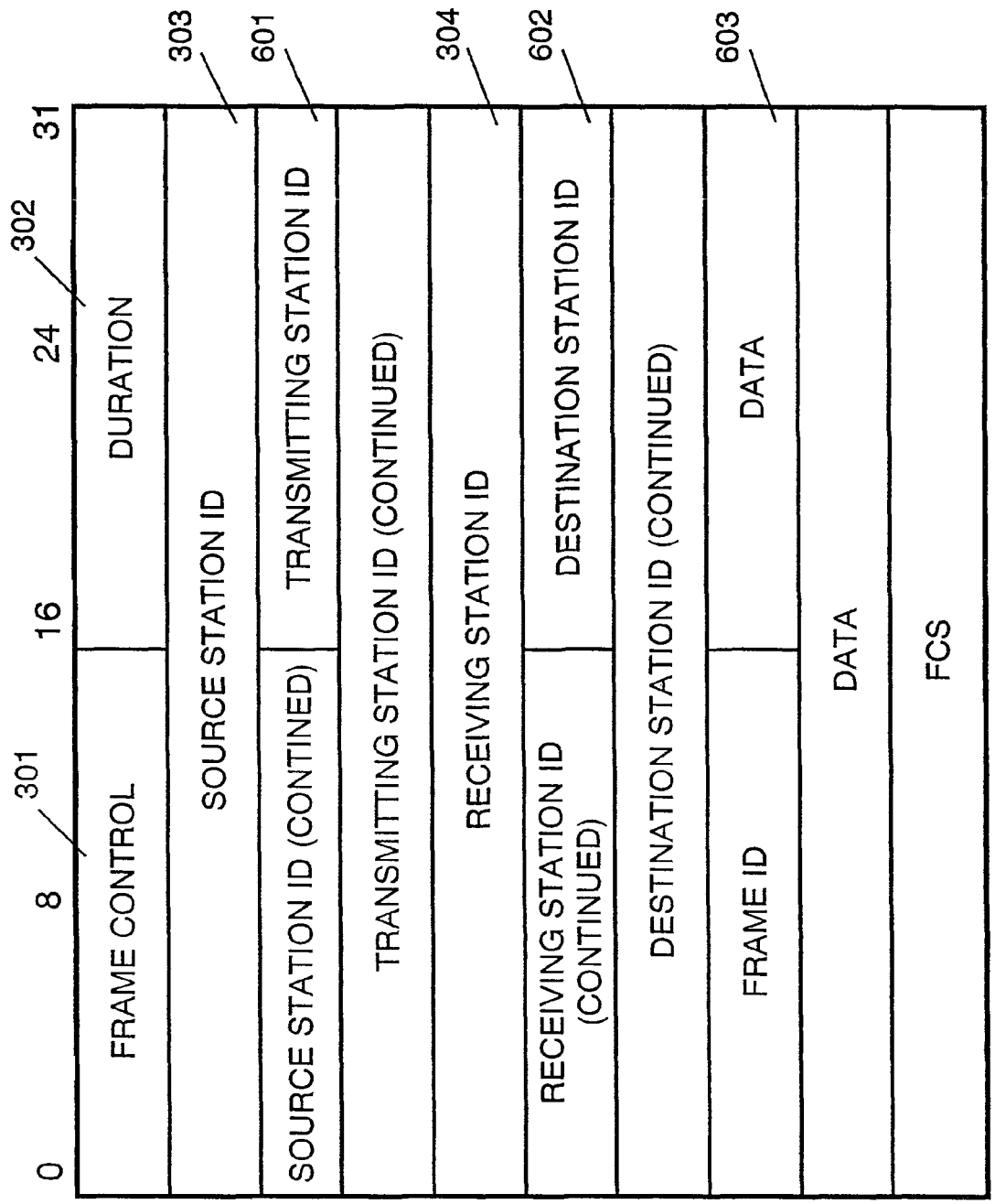
FIG. 6 is a table showing a data frame format according to the embodiment 1 of the invention.

FIG. 6 shows a format of a data frame.

In FIG. 6, source station ID 303 identifies the radio communication device which is a source of data, an transmitting station ID 601 identifies a radio communication device which relays data, receiving station ID 304 identifies a radio communication device which is the relay destination of data, and destination station ID 602 identifies the radio communication device which is a final destination of data. In the receiving station ID 304 and the destination station ID 602, respective MAC addresses of radio communication devices are set.

The communication data selection unit 202 selects the above types of data frames by referring to the frame control 301.

When the communication data selection unit 202 selects a RTS frame, communication information analysis unit 204 extracts the source station ID 303, transmission start time 307 and the transmission occupied time 308 from the RTS frame and registers them in a communication prohibition table 205. When the communication data selection unit 202 selects a CTS frame and in the case that the source station ID of the CTS frame is not the MAC address of the receiving radio communication device, the communication information analysis unit 204 extracts the source station ID 303, the reception start time 401 and the reception dedicated time 402 and registers them in the communication prohibition table 205. A format of the communication prohibition table 205 is shown in FIG. 8.

In FIG. 8, the source station ID 303 is recorded in source ID 801, the time obtained by adding the transmission start time to the time when the RTS frame was received is recorded in start time of use 803, and the time obtained by adding the transmission occupied time 308 to the start time of use 803 is recorded in transmission occupied time 804. Alternatively, the time obtained by adding the reception start time to the time when the CTS frame was received is recorded in the start time of use 803, and the time obtained by adding the reception dedicated time to the start time of use 803 is recorded in the transmission occupied time 804.

The communication information analysis unit 204 sets a communication permitting flag in the time slot of communication reservation which has already been registered in a communication reservation table 206 when the source station ID which transmitted the CTS frame is the MAC address of the receiving radio communication device. The communication reservation table 206 is communication reservation information stored by the radio communication device itself when performing transmission to other radio communication devices. A format of the communication reservation information is shown in FIG. 9.

In FIG. 9, the MAC address of the correspondent node is recorded in destination ID 902, the time until the start of the reserved communication is recorded in start time of use 903, the reserved communication dedicated time is recorded in a transmission dedicated time 904, and a flag indicating whether there has been a response is recorded in response 906.

A communication/response information generation unit 207 generates the CTS frame responding to the RTS frame when it is notified by the communication information analysis unit 204 that the radio communication device has received an RTS frame addressed to that radio communication device. In the present invention, the function of generating the CTS frame in the communication/response information generation unit 207 corresponds to the response information generation unit. At this time, the communication/response information generation unit 207 checks whether in the communication prohibition table 205 the whole or a part of the communication-reserved time slot is included in a registered time slot of another radio communication device.

The communication/response information generation unit 207 also generates the RTS frame for reserving communication to other radio communication devices when it receives a communication reservation request from a communication data generation unit 210 which will be described below. In the present invention, the function of generating the RTS frame in the communication/response information generation unit 207 corresponds to the communication information generation unit. The communication/response information generation unit 207 also sets the time until the start of transmission of data in an event timer 209.

The communication data generation unit 210 generates a transmission data frame from message content data and the like which has been transferred from an application unit 203 when the communication data generation unit 210 receives a communication request from the application unit 203. It also instructs the communication/response information generation unit 207 to reserve the time slot for transmitting data.

Communication operations performed by the radio communication devices 101 to 104 having the above configuration will be explained.

Figure 18:
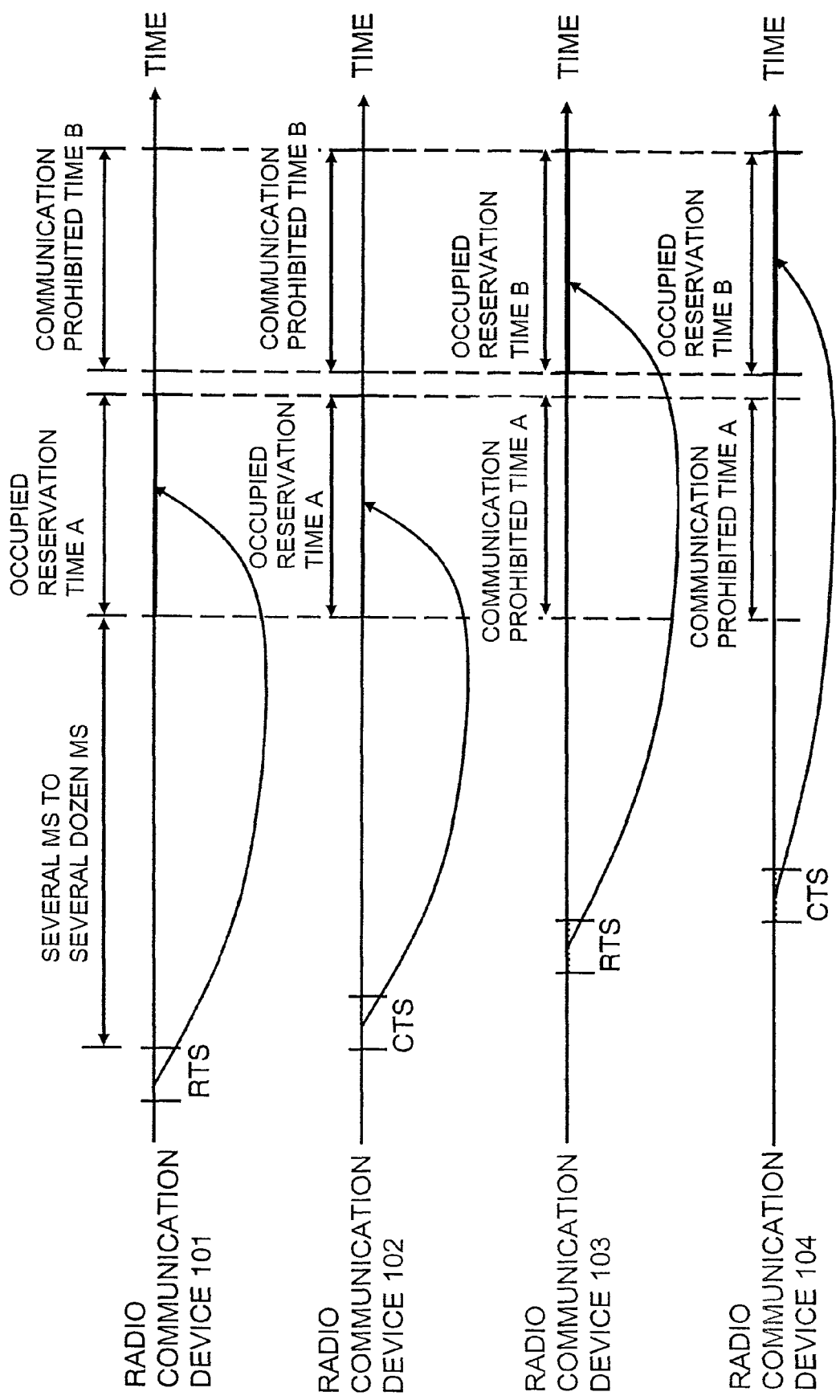
FIG. 18 is a view showing an operational principle of the radio communication method according to the embodiment 1 of the invention.

First, the basic operational principles will be explained with reference to the drawing. FIG. 18 is a view explaining operational principles of the invention.

In the invention, not only a reservation of a communication time slot caused by and following just after the exchange of RTS/CTS which is made in general, but also a reservation for a communication time slot after a time lag of several milliseconds to several dozen milliseconds (in principle, several micro seconds can be possible) is made to occupy the communication media. Specifically, as shown in FIG. 18, when the radio communication device 101 exchanges RTS/CTS with the radio communication device 102, the device reserves a dedicated reservation time "A" at the time removed from the RTS. The reservation notification is also made to surrounding the radio communication devices 103 and 104 by the exchange of RTS/CTS. Therefore, when the radio communication device 103 makes a reservation for dedicated use of the communication media, the radio communication device 103 makes a reservation for dedicated use of time "B" at a time slot avoiding the reserved time "A" as shown in FIG. 18. Accordingly, each radio communication device performs scheduling for communication reservation autonomously based on the dedicated time information in the RTS and CTS which are transmitted or received among other radio communication devices in the communicable area. A communication operation according to the embodiment will be explained in detail as follows.

In the initial condition, the communication/response information generation unit 207 of the radio communication devices 101 to 104 continually generates Keep Alive frames in a prescribed cycle and transmits them to the other radio communication devices in the communicable area of the transmitting unit 211.

At the same time, when the communication data selection unit 202 receives the Keep Alive frames from other radio communication devices through the receiving unit 201, the communication data selection unit 202 detects the radio communication devices in the communicable area based on the source station IDs.

Accordingly, the radio communication devices 101 to 104 notify their presence to one another. Specifically, in the position relation between radio communication devices 101 to 104 in the radio communication network in FIG. 1, the radio communication device 101 detects the presence of the radio communication device 102, and the radio communication device 102 detects the presence of the radio communication devices 101, 103 and 104. Similarly, the radio communication device 103 detects the radio communication devices 102 and 104, and the radio communication device 104 detects the radio communication devices 102 and 103.

Next, an operation of communication reservation, where a radio communication device transmits data addressed to a radio communication device in the communicable area, will be explained.

Figure 10:
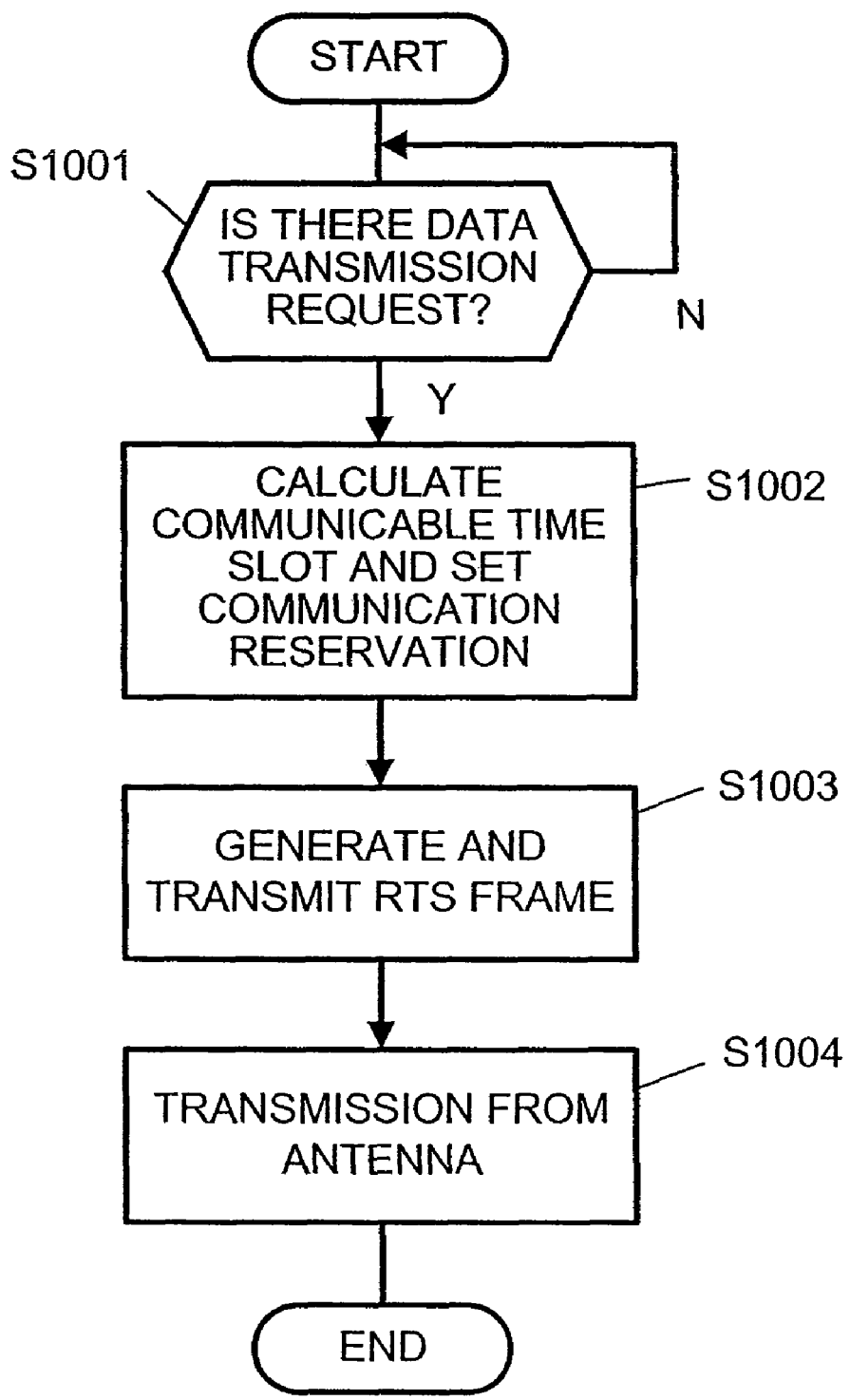
FIG. 10 is a flow chart showing operations in which the radio communication device transmits an RTS signal according to the embodiment 1 of the invention.

FIG. 10 is a flow chart showing an operation of transmitting the RTS frame for the communication reservation.

First, when the communication data generation unit 210 receives from the application unit 203 a transmission request for transmission of message content data to another radio communication device (step S1001), the communication data generation unit 210 instructs the communication/response information generation unit 207 to reserve a communication.

Next, the communication/response information generation unit 207 refers to the communication prohibition table 205 and finds a time slot in which communication is not prohibited. Then, the time slot in which communication is possible is registered in the communication reservation table (step S1002). In the initial state of the communication prohibition table 205, no prohibited time slot is recorded, but when the radio communication device receives a communication reservation not addressed to itself, the communication information analysis unit 204 records the communication-prohibited time slot.

Next, communication/response information generation unit 207 sets the transmission start time and the transmission dedicated time in transmission start time 307 and transmission occupied time 308 of the RTS frame respectively to reserve the time slot in which transmission is possible. In addition, in generating the RTS frame, its own MAC address is set in the source station ID 303 and the destination MAC address is set in the receiving station ID 304 (step S1003). After that, the communication/response information generation unit 207 delivers the RTS frame to the transmitting unit, which is sent through the antenna 200 (step S1004).

The above is a description of the operations for reservation for data transmission by the radio communication device.

Figure 11:
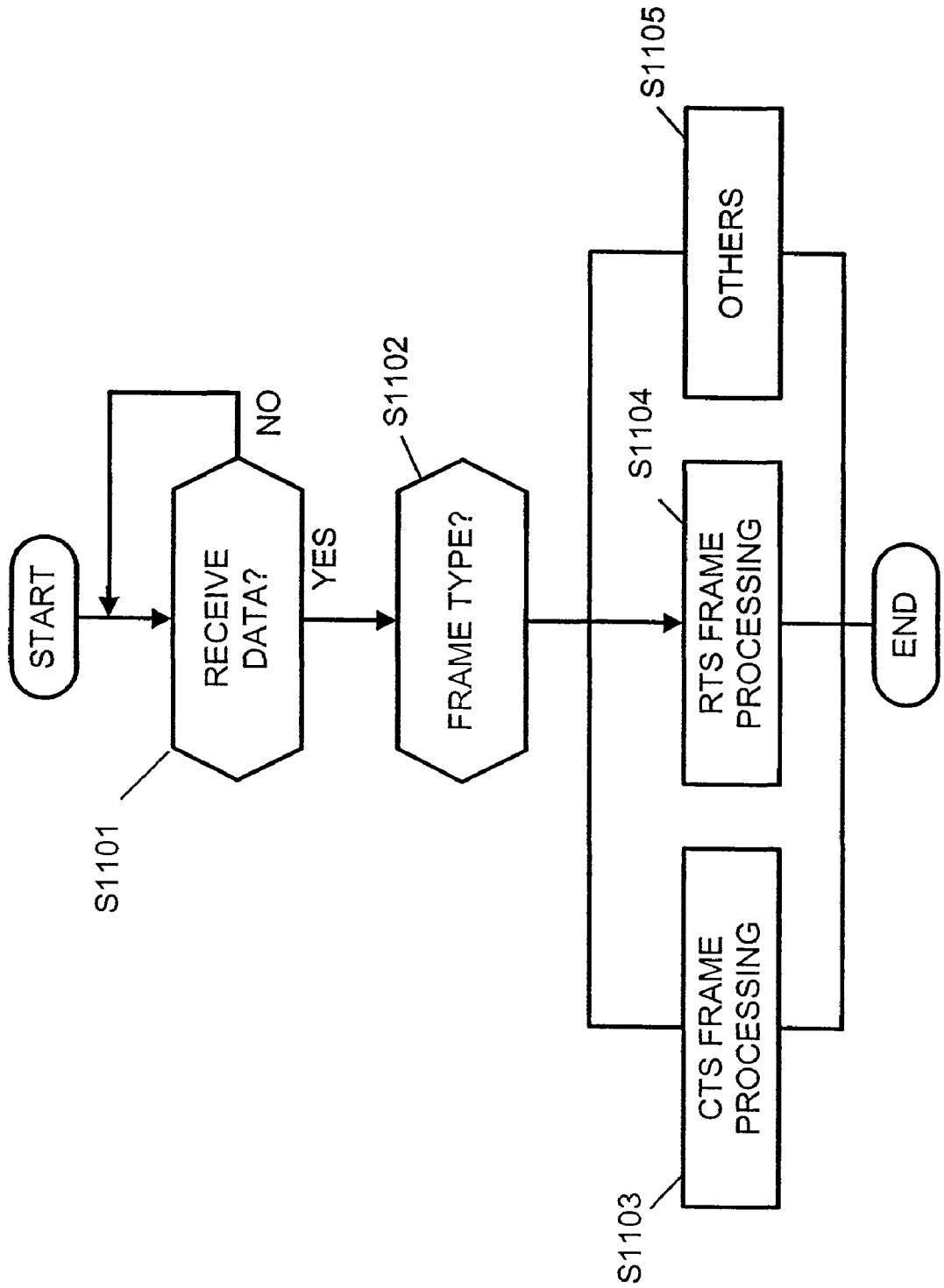
FIG. 11 is a flow chart showing reception operations performed by the radio communication device according to the embodiment 1 of the invention.

Next, a reception operation and a data transmission operation performed by the radio communication device will be explained with reference to FIG. 11 to FIG. 13.

First, a signal received from the antenna 200 is converted to a digital frame in the receiving unit 201 (step S1101), and the communication data selection unit 202 selects the type of the frame (step S1102).

After that, according to the frame type, CTS frame processing (S1103), an RTS frame processing (S1104), or other processing (processing when a Keep Alive frame, the data frame or the like are received) are performed.

Figure 12:
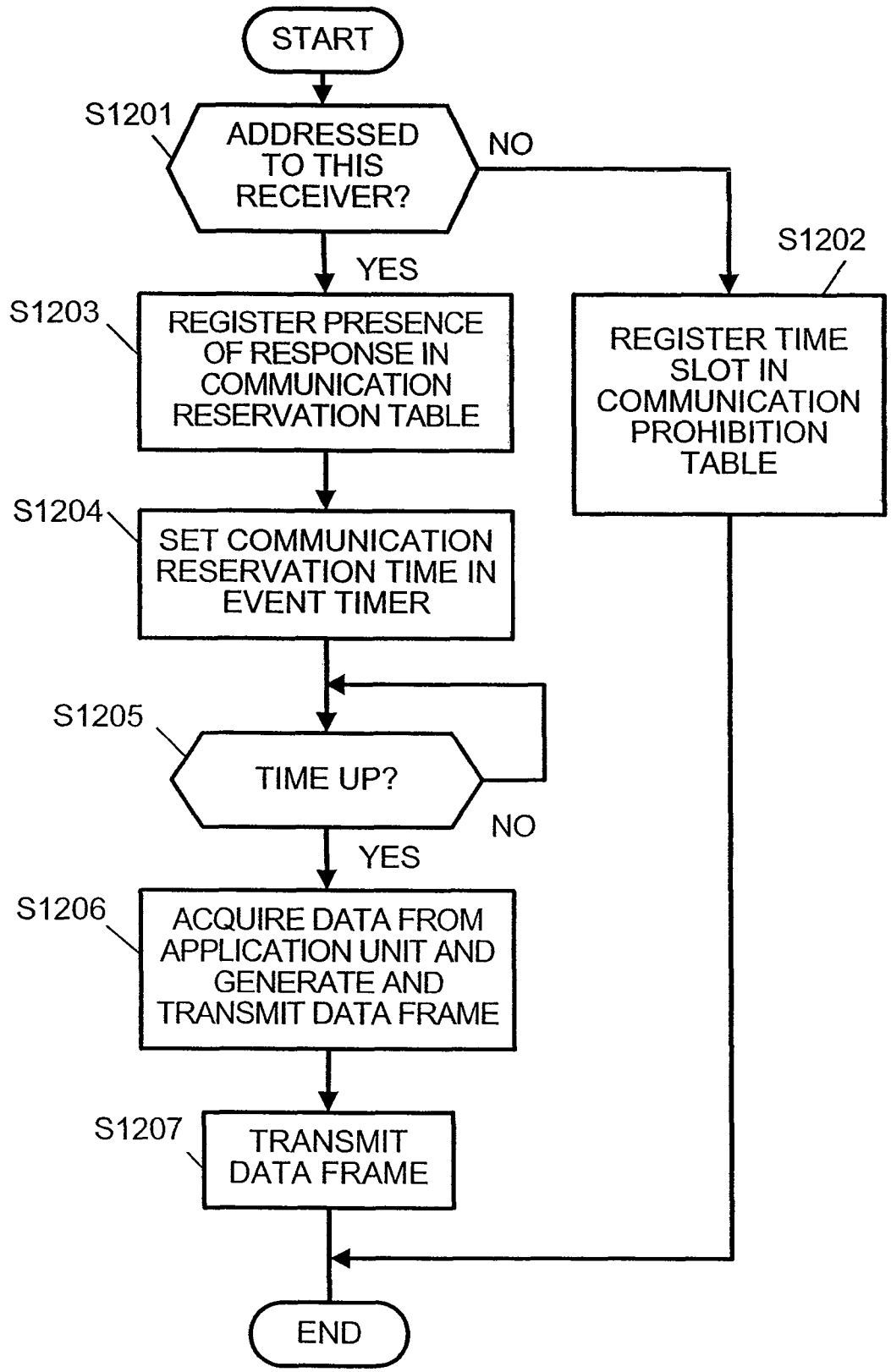
FIG. 12 is a flow chart showing a CTS frame processing performed by the radio communication device according to the embodiment 1 of the invention.

FIG. 12 is a flow chart showing the CTS frame processing.

First, the communication information analysis unit 204 judges whether the MAC address in the source station ID is its own address (step S1201), and when the MAC address is not that of the receiver, the start time of use and the transmission occupied time 804 found in the transmission start time 307 and the transmission occupied time 308 are registered in the communication prohibition table 205, associating them with the source station ID 303 (step S1202).

On the other hand, when the MAC address is that of receiver, a flag indicating the presence of a response is set in response 906 of the communication reservation table 206 (step S1203).

Next, the communication/response information generation unit 207 sets the start time of use 903 already registered as corresponding to the reception ID of the receiving station ID 304 in the communication reservation table 206, in the event timer 209, and starts operation (step 51204).

Next, the event timer 209 makes a notification to the communication data generation unit 210 when the event timer expires (step S1205). On receipt of the notification, the communication data generation unit 210 receives message content data and the like to be transmitted from the application unit 203 and generates a data frame (step S1206). Then, the communication data generation unit 210 delivers the generated data frame to the transmitting unit 211, where it is sent through the antenna 200 (step S1207).

Figure 13:
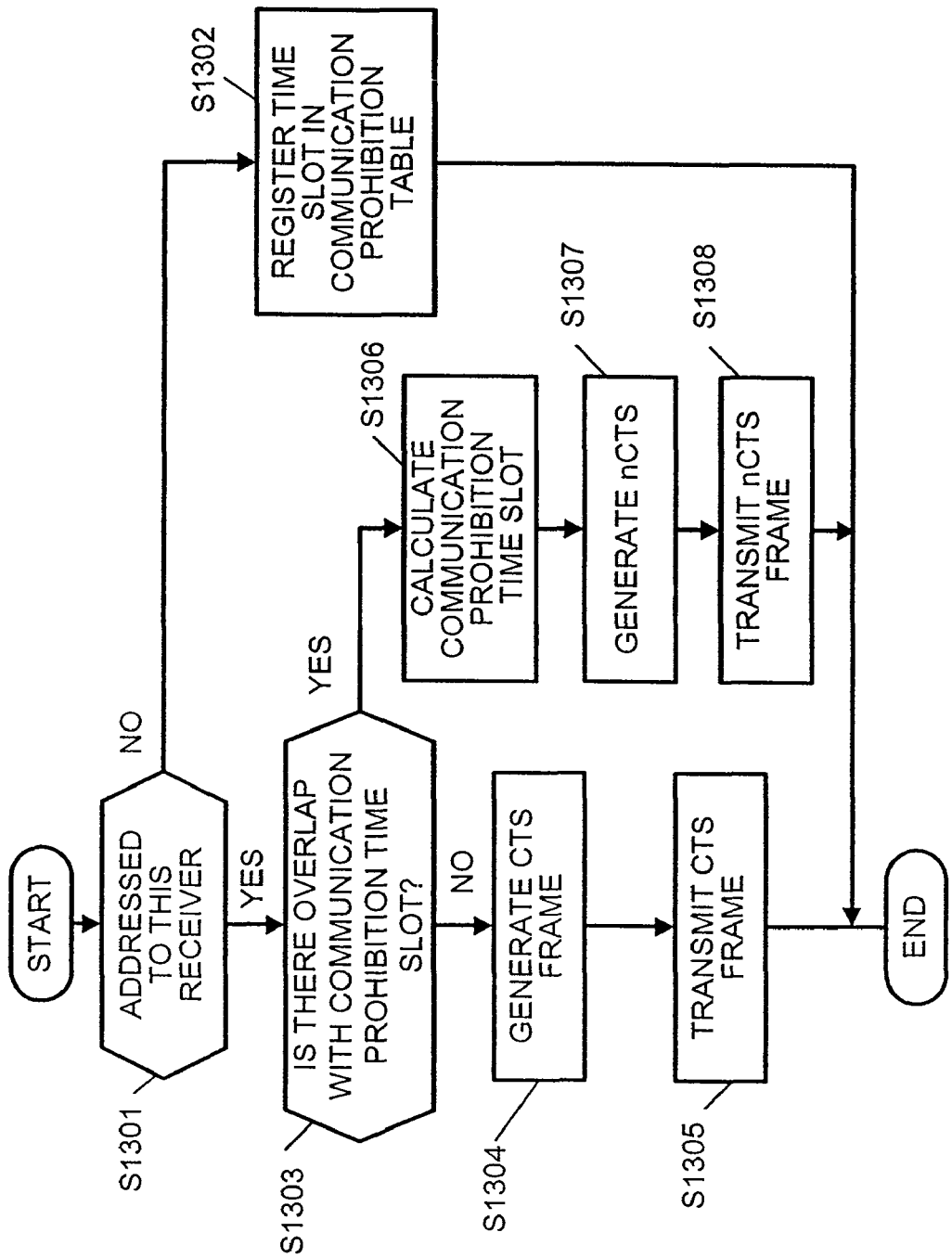
FIG. 13 is a flow chart showing an RTS frame processing performed by the radio communication device according to the embodiment 1 of the invention.

FIG. 13 is a flow chart showing the RTS frame processing.

The communication information analysis unit 204 judges whether the MAC address in the source station ID 303 of the RTS frame is the address of the receiver (step S1301), and when it is not, the start time of use and the transmission dedicated time found in transmission start time 307 and transmission occupied time 308 are registered in the communication prohibition table 205, associating them with the source station ID 303 (step S1302).

On the other hand, when the MAC address is that of the receiver, it is checked whether there is a time slot in the communication prohibition table 205 overlapping with even a part of the received communication reservation time slot (step S1303).

When there is no overlapping time slot, the communication/response information generation unit 207 judges that the reception is possible without interference by other radio communication devices and generates a CTS frame (step S1304). After that, the communication/response information generation unit 207 delivers the CTS frame to the transmitting unit 211, where it is sent through the antenna 200 (step S1305).

In the step S1303, when there is an overlapping time slot, the overlapping prohibited time slot is calculated from the communication-prohibited time slots registered in the communication prohibition table 205 (step S1306).

Next, the communication/response information generation unit 207 sets the calculated communication-prohibited time slot in the reception start time 401 and the reception dedicated time 402. Further, a frame ID identical with the RTD frame is set in frame ID 306 (step S1307). In the case that there are plural calculated time slots, their reception start times 401 and their reception dedicated times 402 are set and the number of pairs are set in the number of entries. After that, the communication/response information generation unit 207 delivers the nCTS frame to the transmitting unit 211, where it is sent through the antenna 200 (step S1308).

Other reception processing operations are the usual operations, namely, delivery of data and the like from the communication data selection unit 202 to the application unit 203.

Figure 7:
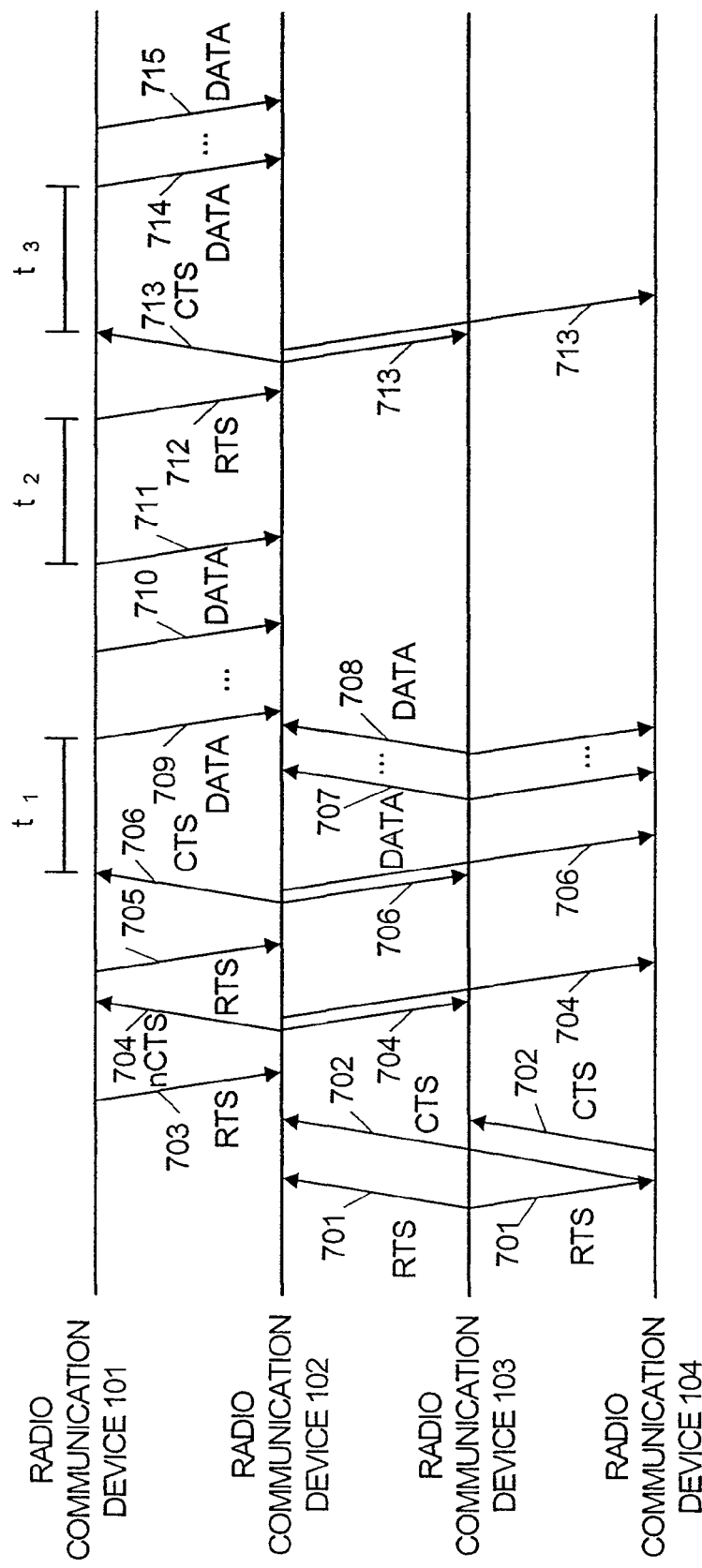
FIG. 7 is a view showing communication sequences between radio communication devices according to the embodiment 1 of the invention.

Operations in which the radio communication devices operating as described above perform communication with one another in the radio communication network shown in FIG. 1 will be explained as follows with reference to FIG. 7. The case where the radio communication device 101 transmits data to the radio communication device 102 is cited as an example.

First, the radio communication device 103 transmits an RTS signal 701 in the area 113 from the non-directional antenna to make communication with the radio communication devices 104 in the communicable area 113. Since radio communication device 102 is in the area 113, it receives the RTS signal 701 from the radio communication device 103. At this time, the radio communication device 102 registers the transmission dedicated time of the RTS signal 701 in the communication prohibition table as a communication-prohibited time slot. FIG. 8 shows the registration data at that time, in which the MAC address of the source station ID of the received RTS signal 701 is recorded in source ID 801, the reception destination station ID 304 of the received RTS signal 701 is recorded in destination ID 802, the transmission start time 307 of the received RTS signal 701 is recorded in start time of use 803, the transmission occupied time 308 of the RTS signal 701 is recorded in transmission occupied time 804, the frame ID 306 of the received RTS signal 701 is recorded in frame ID 805 and the channel number (CH) 310 of the received RTS signal 701 is recorded in reception channel ID 806.

Next, a CTS signal 702 is sent from the radio communication device 104 to the radio communication devices 103 in the area 114. The radio communication device 102 is also located in the area 114, and therefore it receives the CTS signal 702. At this time, the radio communication device 102 tries to register in the communication prohibition table as a communication-prohibited time slot, however, registration has already been done when it receives the RTS signal 701, and so the registration is not performed again.

Next, the radio communication device 101 transmits a RTS signal 703 to start communication with the radio communication device 102 located in the communicable area 111.

Next, when the radio communication device 102 receives the RTS signal 703 from the radio communication device 101, the radio communication device 102 recognizes that the radio communication device 101 requests communication to the radio communication device 102, based on the source station ID 303 and the receiving station ID 304 of the RTS frame. The radio communication device 102 detects the time slot of data transmission from the transmission start time 307 and the transmission occupied time 308. When the radio communication device 102 refers to the communication prohibition table 205 and detects that the detected time slot is in the same channel and partially overlaps the time slot of communication between the radio communication device 103 and the radio communication device 104 which has been previously recorded, the radio communication device 102 notifies the radio communication device 101 that the reception in the designated time slot cannot be performed and gives the communication-prohibited time slot by an nCTS signal 704. However, when the channel in the communication prohibition table 205 is a different channel, the radio communication device 102 sends a CTS signal in response to the RTS signal in the usual manner. The radio communication device 102 prohibits communication in all communication-prohibited time slots registered in the communication prohibition table 205.

Next, when the radio communication device 101 receives a nCTS signal 704, it finds a time slot where transmission is possible, eliminating the communication-prohibited time slots which has been notified by the radio communication device 102, and again reserves communication by designating the found time slot in a RTS signal 705.

Next, when the radio communication device 102 receives an RTS signal 705, it confirms that the time slot reserved does not overlap with the communication-prohibited time slot which is registered in the communication prohibition table 205 and transmits a CTS signal 706 to the radio communication device 101. Further, CTS signal 706 is registered in the communication reservation table so that the radio communication device 102 refuses transmissions to it from other radio communication devices. FIG. 9 shows the registered data at that time; the source station ID 303 of the RTS signal 705 is recorded in source ID 901, the receiving station ID 304 of the RTS signal 705 is recorded in destination ID 902, the transmission start time 307 of the RTS signal 705 is recorded in start time of use 903, the transmission occupied time 308 of the RTS signal 705 is recorded in transmission dedicated time 904, the frame ID 306 of the RTS signal 705 is recorded in frame ID 905 and "0(zero)" is recorded in response 906.

Next, when the CTS signal 706 is received and it is judged that communication is possible, the radio communication device 101 sets the transmission start time "t1" in the event timer 209 and starts operation. At this time, the CTS signal is also transmitted to the radio communication device 103 and the radio communication device 104 which are located in the communicable area 112 of the radio communication device 102, and therefore the radio communication device 103 and the radio communication device 104 record as the communication-prohibited time slot respectively in the same way as the radio communication device 102.

After that, data transmissions 707 to 708 are performed from the radio communication device 103 to the radio communication device 104. At this time, the radio communication device 102 receives these data transmissions but ignores them as they are not addressed to it.

Next, the radio communication device 101 performs data transmissions 709 to 710 after the set transmission start time "t1" has passed, which are received by the radio communication device 102. When the radio communication device 101 still has data to be transmitted at the end of the time slot in which communication is reserved, or when it wants to transmit data to the radio communication device 102 by synchronizing timing with it, it gives notice of continuation of data and the time "t2" when the next RTS signal will transmitted, by a signal 711. The frame used at this time is the same as the RTS frame.

Next, when the radio communication device 102 acquires the time "t2" when an RTS signal 712 is to be transmitted, it registers the time in the communication reservation table so as to refuse transmissions to it from other radio communication devices.

Next, the radio communication device 101 transmits the RTS signal to the radio communication device 102 at the designated time "t2" to reserve communication. At this time, a new transmission start time "t3" is given.

Subsequent operations are the same as the operations after receiving the RTS signal 705. When the radio communication device 102 receives the RTS signal 712, it confirms that the time slot does not overlap with a communication-prohibited time slot which is registered in the communication prohibition table 205 and transmits a CTS signal 713 to the radio communication device 101. After the time "t3" has passed, the radio communication device 101 performs data transmissions 714 to 715 and the radio communication device 102 receives them.

In the present embodiment, notification of the communication-prohibited time slots is made from the destination radio communication device to the source radio communication device, but the embodiment is not limited to this, and it is possible that a time slot in which communication is permitted is given. According to this, only a time slot which is suitable for the receiving radio communication device is notified, and as a result, it becomes possible to make a shorter CTS frame than where plural communication-prohibited time slots are given.

Also, in the embodiment, the radio communication device 102 gives notice that reception is not permitted and gives the communication-prohibited time slot using the nCTS frame when the communication reservation from the radio communication device 101 overlaps with a communication-prohibited time slot, but the embodiment is not limited to this, and it is possible to give notice only that reception is not permitted, by setting the collision bit (CO) 309 of the CTS frame. In this case, the source radio communication device receives the notification that reception is not permitted and, if necessary, inquires of the destination radio communication device about the communication-prohibited time slots. Then, it is possible that the destination radio communication device responds to the inquiry and gives the communication-prohibited time slots. According to this, the source radio communication device does not inquire as to the communication-prohibited time slots, if not necessary, and therefore the source and destination radio communication devices do not have to perform unnecessary data transmission.

As described above, according to the invention, the radio communication device in question can receive the RTS signals sent from other radio communication devices in the communicable area, and therefore the device in question can know the time slots used by other radio communication devices to perform their communication with devices other than the device in question. Therefore, the communication addressed to the device in question can be performed at times other than the time slots in which other radio communication devices perform data transmission, and as a result, the device in question can receive data addressed to it without interference.

The data-receiving radio communication device according to the embodiment gives notice of a collision to the source radio communication device when the collision of communication reservation time occurs, but the embodiment is not limited to this, and it is possible that, at that time, a normal response frame is sent and that when the collision occurs after transmitting actual data, a response frame in which the collision bit is set and the communication-available time is written is sent back. In the response frame, a transmission prohibited time slot or a transmittable time slot from the point of collision until a certain time is written. Accordingly, the source radio communication device receives the response frame, and as a result, the next reservation can be made without collision.

The radio communication device according to the invention can also send or receive the RTS signal at any time, and therefore the possibility of reception failure caused by the collision of the RTS signal is low. Accordingly, it is easy to realize the above operation.

The radio communication device according to the invention gives notice of the communication time of the RTS signal to be transmitted next at the end of a data transmission, and therefore the RTS signal can be received more precisely. By fixing the transmission start time from the RTS signal, synchronized data communication with the destination becomes possible.

Furthermore, the radio communication device according to the invention can receive the RTS signal at any time, and therefore the radio communication devices in the communicable area can receive broadcasts transmitted from other radio communication devices.

The radio communication device according to the invention can also perform communication using plural channels simultaneously, and therefore larger capacity communication becomes possible.

Embodiment 2

Figure 14:
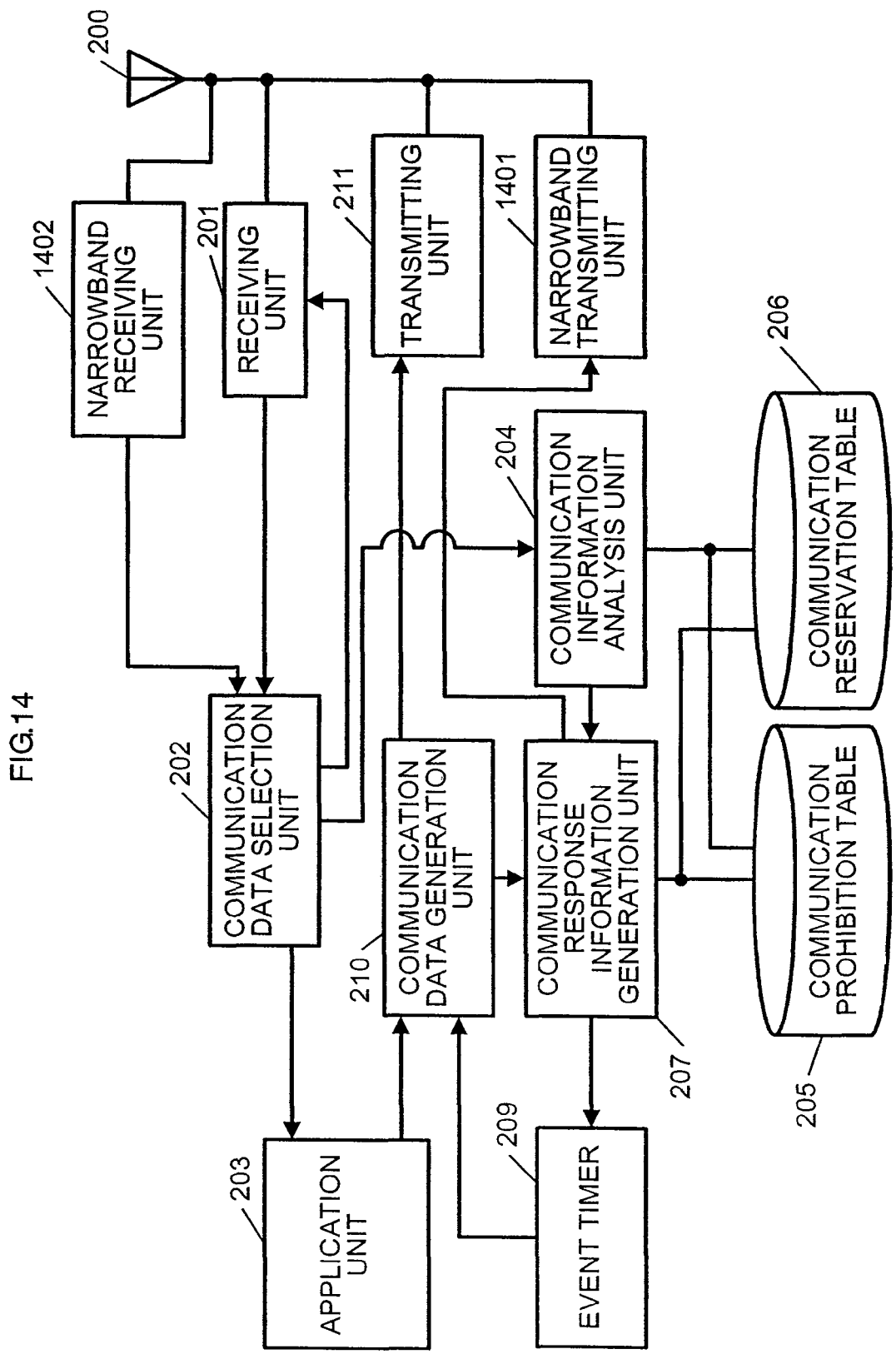
FIG. 14 is a diagram showing a configuration of a radio communication device according to an embodiment 2 of the invention.

FIG. 14 is a block diagram showing a configuration of a radio communication device according to the embodiment. It differs from the configuration of the radio communication device written in the embodiment 1 in that a narrowband receiving unit 1402 and a narrowband transmitting unit 1401 in which transmission and reception can be performed only in a narrow-band channel are included, in addition to the receiving unit 201 and the transmitting unit 211.

In FIG. 14, the narrowband transmitting unit 1401 has a transmission channel which is limited to less than or equal to a previously prescribed value, and transmits an RTS signal or a CTS signal. The transmitting unit 211 is used for data transmission and the like, the communication/response information generation unit 207 transmits the RTS signal or the CTS signal to the narrowband transmitting unit 1401.

The narrowband receiving unit 1402 has a reception channel which is limited to less than or equal to the previously prescribed value and which receives an RTS signal or CTS signal. The communication data selection unit 202 selects frames from the receiving unit 201 and the narrowband receiving unit 1402, and instructs the receiving unit 201 to save power when data reception is completed, shifting to a RTS signal reception mode, or instructs the receiving unit 201 to return from the power saving mode when shifting to a data reception mode.

The receiving unit 201 stops its receiving function when it receives the notification for power saving from the communication data selection unit 202, and goes into the power saving mode until it receives the instruction for the return.

Components other than the above are the same as the embodiment 1.

The communication operations are also the same as the embodiment 1 except that the RTS signal and the CTS signal are transmitted from the narrowband transmitting unit 1401 and that the RTS signal and the CTS signal are received in the narrowband receiving unit 1402.

Thus, the narrowband radio communication is performed by the RTS signal and the CTS signal, and therefore when the data transmission and reception are completed, an UWB radio communication device can put the receiving unit 201 into the power saving mode until it receives the RTS signal. Accordingly, even when the UWB radio communication device which requires much power for carrier sense of UWB is in a receivable state for the RTS signal at any time, power consumption can be suppressed.

Embodiment 3

Figure 15:
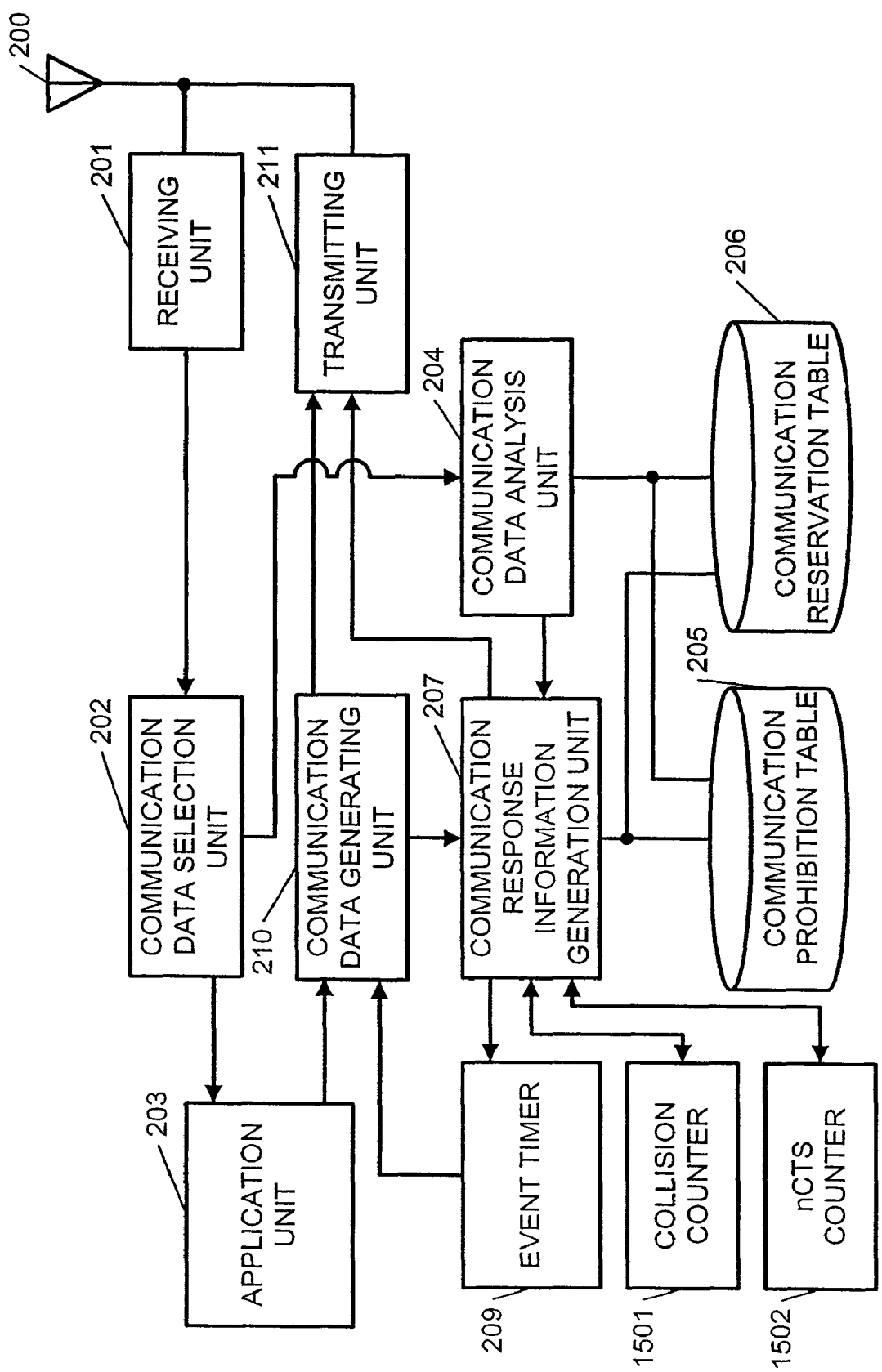
FIG. 15 is a diagram showing a configuration of a radio communication device according to an embodiment 3 of the invention.

FIG. 15 is a block diagram showing a configuration of a radio communication device according to the embodiment.

In FIG. 15, the embodiment differs from embodiment 1 in that a collision counter 1501 and an nCTS counter 1502 are included.

The collision counter 1501 counts the number of times the collision occurs per unit time.

Operations of the radio communication device according to the embodiment will be explained as follows. The only different point from the embodiment 1 is the processing when an RTS frame is received, and other processing operations are the same.

Figure 16:
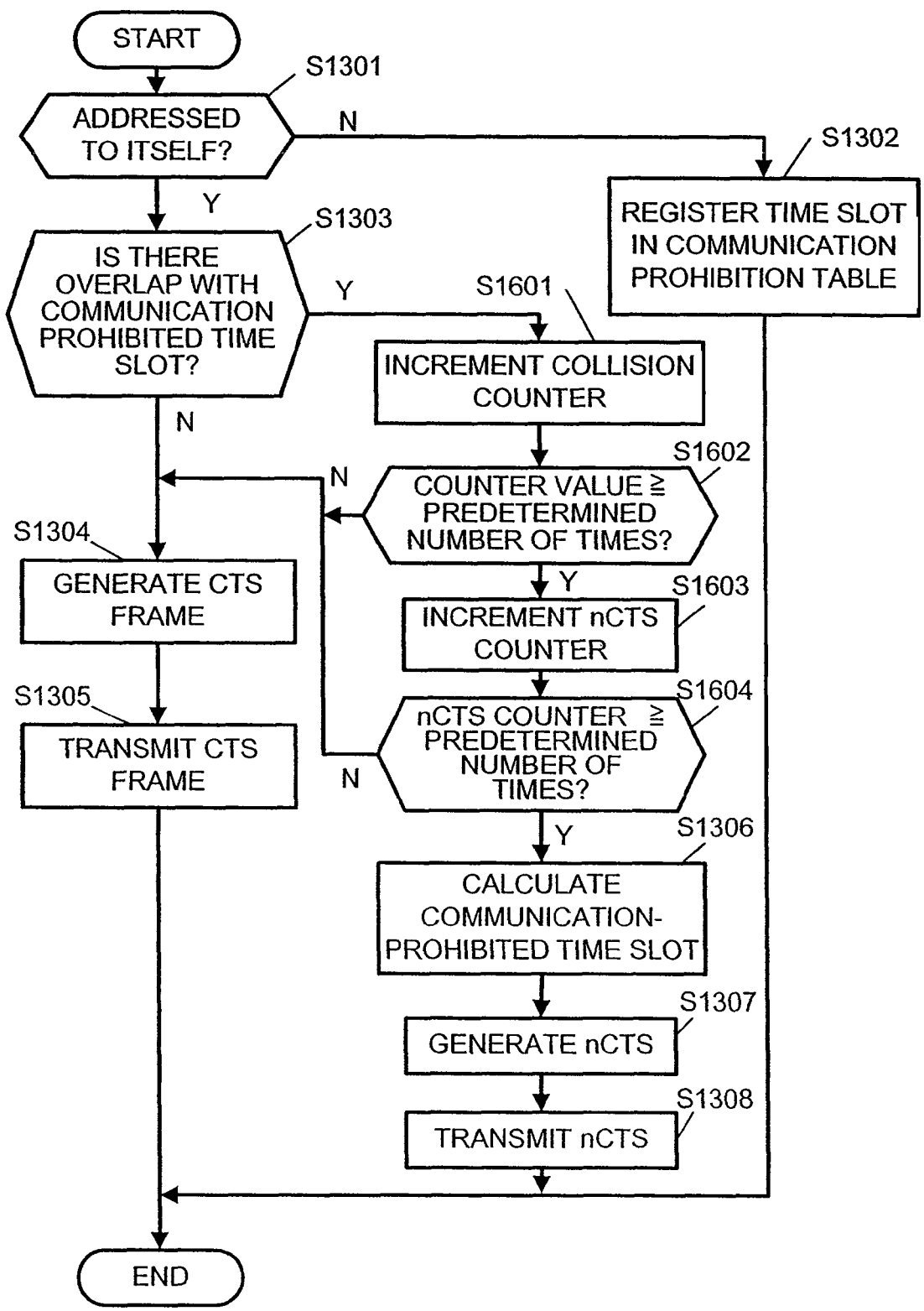
FIG. 16 is a flow chart showing an RTS frame processing performed by the radio communication device according to the embodiment 3 of the invention.

FIG. 16 is a flow chart showing a processing when the communication data selection unit 202 judges a frame to be an RTS frame, which corresponds to the operation of step S1104.

In FIG. 16, operations from step S1301 to step S1305 are the same as the embodiment 1.

In the step S1303, when the communication/response information generation unit 207 judges that there is an overlap between the received communication reservation time slot and a communication-prohibited time slot registered in the communication prohibition table 205 even partially, the collision counter is incremented (step S1601). As a result, when the counter value is less than the predetermined number of times, three in this embodiment (step S1602), the process proceeds to step S1304, and the CTS frame is transmitted without setting the collision bit 309.

On the other hand, when the counter value is more than or equal to three, the nCTS counter 1502 is incremented (step S1603). When, as a result, the counter value of the nCTS counter 1502 is less than a predetermined number, one time in this embodiment (step S1604), the process proceeds to step S1304.

In the case that the counter value of the nCTS counter is more than or equal to one (step S1604), a communication-prohibited time slot is calculated from the communication prohibition table 205 (step S1306). The processings from this step (step S1306) to step S1308 are the same as in embodiment 1, namely, the nCTS frame in which the communication-prohibited time slot is set is transmitted to the source radio communication device.

The collision counter 1501 and the nCTS counter 1502 are reset every second by a timer which is not shown.

In the embodiment, the judgment to transmit the nCTS frame based on the collision frequency is made when collisions three or more times in a second occur and when the nCTS counter reads one or more, but the embodiment is not limited to this, and the above judgment can be made when collisions three or more times in a second occur, and when the ratio of the communication-prohibited time slots to the total time of the communication-permitted time slots and the communication-prohibited time slots becomes more than or equal to 30%. Alternatively, the detection of collision can be made by confirming that data cannot be received from the radio communication device that has a reservation in a time slot where a transmission prohibited time slot found by the radio communication device and a communication reservation time slot for communication addressed to the receiver overlap.

The above judgment not limited to the above, and can be made in a different way.

Also in the embodiment, as is the case with the embodiment 1, the destination radio communication device makes a notification using the nCTS frame that the reception is not permitted and of the communication-prohibited time slot, when the number of collisions are more than or equal to the predetermined number of times, but the embodiment is not limited to this, and it is possible merely to make a notification that the reception is not permitted by setting the collision bit (CO) 309 of the CTS frame.

In the same way as the embodiment 1, when the source radio communication device receives the nCTS frame, the source radio communication device finds a time slot adapted to a transmission condition in the time slots other than the communication-prohibited time slot notified from the destination radio communication device, and reserves communication anew by designating the found time slot in the RTS signal.

It is also possible that, in the same way as the embodiment 1, when the source radio communication device receives the nCTS frame, the source radio communication device inquires of the destination radio communication device about the communication-prohibited time slot, and the destination radio communication device responds to the inquiry giving the communication-prohibited time slot.

According to this, the source radio communication device does not inquire as to the communication-prohibited time slot if not necessary, and therefore the source and destination radio communication devices do not have to perform unnecessary transmission of information.

The source radio communication device also selects a time slot among the transmission prohibited time slots or the transmission-permitted time slots received from the destination radio communication device which satisfies a prescribed condition, for example, a time slot longer than a certain period of time, and again transmits that time slot to the destination radio communication device as communication time reservation request information.

In this manner, the reservation can be transmitted by confirming the time slot in which communication is possible in advance.

As described above, when the communication reservation of a time slot which overlaps with a communication-prohibited time slot is requested, the radio communication device according to the embodiment does not respond to the source radio communication device with the notification of collision and non-permission of communication until such collision occurs a predetermined number of times. Further, in the case that the collision frequency decreases, the radio communication device does not respond to the source radio communication device with the notification of collision and non-permission of communication again. Therefore, it is possible that under conditions where the collision frequency is low and there is no interference for continuing communication, the communication continues, and the operation of re-designating the time slot in order to avoid collision is performed only in the case where the collision frequency increases.

Embodiment 4

A configuration of a radio communication device according to this embodiment is the same as embodiment 3, but a part of the function of the communication/response information generation unit 207 differs. Specifically, when the communication/response information generation unit 207 receives a RTS signal not addressed to it, it checks the collision counter 1501. Then, the unit sets its station ID in place of the source station ID 303 and the receiving station ID 304 in the received RTS signal, and adjusts the reservation time. After that, the communication/response information generation unit 207 re-generates an RTS signal and outputs it to the transmitting unit 211.

Operations of the radio communication device according to the embodiment will be explained as follows. The only operation different from embodiment 3 is the processing when the RTS frame is received, and the other processing operations are the same.

Figure 17:
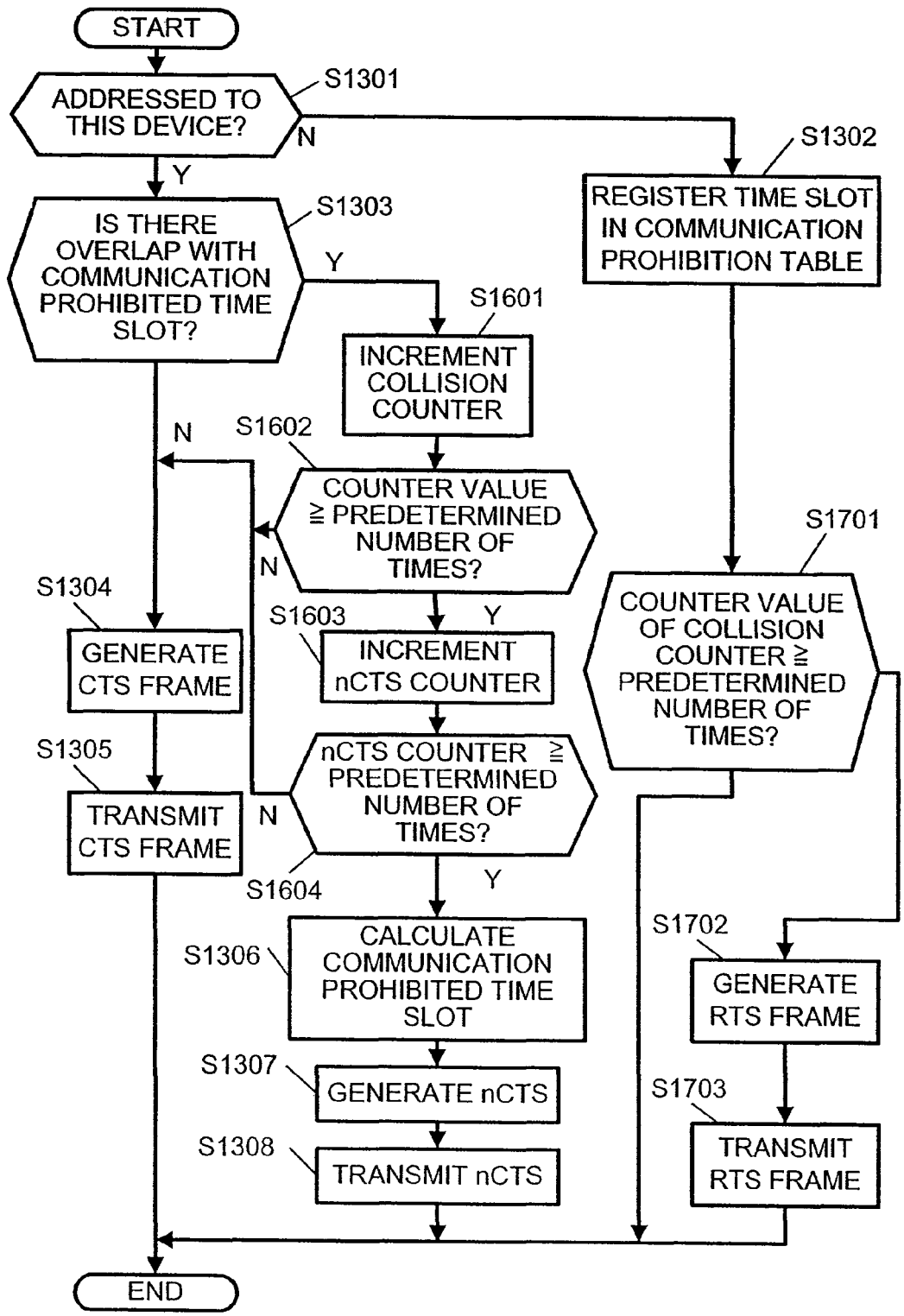
FIG. 17 is a flow chart showing an RTS frame processing performed by a radio communication device according to an embodiment 4 of the invention.

FIG. 17 is a flow chart showing the processing when the communication data selection unit 202 judges the frame to be an RTS frame. This processing corresponds to the operations of step S1104 in FIG. 11.

In FIG. 17, the processing after the communication data selection unit 202 receives an RTS signal not addressed to it (step S1302 and from step S1702 to step S1703) is different from the embodiment 3, but the other processing operations are the same. The processing different from the embodiment 3 is explained as follows.

The communication information analysis unit 204 extracts the communication prohibited time slot from the received RTS frame and registers it in the communication prohibition table 205 (step S1302).

Next, when the counter value of the collision counter 1501 is less than the predetermined number of times, for example, not more than or equal to 10 times (step S1701), the communication/response information generation unit 207 ends the processing, and when the counter value is more than or equal to ten (step S1701), it generates an RTS frame in which its station ID replaces the source station ID and the destination station ID in the received RTS frame and also reservation time is adjusted (step S1702). Then, the RTS frame in which a relay bit 311 is "on" is transmitted (the RTS in which the relay bit is "on" is not relayed again). After that, the communication/response information generation unit 207 delivers the RTS frame to the transmitting unit 211, where it is transmitted from the antenna 200 (step S1703).

As described above, when the collision frequency is high the radio communication device according to the embodiment forwards a received RTS signal not addressed to it in the communicable area. Specifically, in the radio communication network shown in FIG. 1, when the radio communication device 102 receives the RTS signal from the radio communication device 103, the radio communication device 102 forwards the RTS signal to the radio communication device 101.

In this manner, the radio communication device 101 does not receive the RTS signal from the radio communication device 103, but it can receive the RTS signal forwarded by the radio communication device 102, and since the device has received an RTS signal not addressed to it, it registers that communication reservation time slot in the communication prohibition table 205. At this time, the addresses in source station ID and destination station ID are the same, and therefore the radio communication device 101 can recognize that the transmission station of the remade RTS is the radio communication device 102, and as a result, the radio communication device 101 can make a communication reservation which avoids that time slot when starting communication with the radio communication device 102.

Embodiment 5

The configuration of a radio communication device according to this embodiment is the same as embodiment 3, except that the collision counter 1501 is used by the radio communication device transmitting the RTS. A radio communication device which transmits an RTS sends a request for communication reservation of a certain time slot through the RTS frame, and a radio communication device which transmits CTS responds with the CTS frame. At this time, when the radio communication device which transmits the CTS detects a collision of the reservation time, the device transmits a CTS frame in which a collision bit is added. The transmitting radio communication device sees the collision bit in the received CTS frame and records it in a CTS counter (in this case, the nCTS counter 1502 is referred to by this name). The transmitting radio communication device actually attempts transmission of data, and if the data transmission is completed normally, the CTS counter is cleared. In the case that some abnormality occurs, the transmitting radio communication device counts up the collision counter and records the occurrence of collision. Note that the CTS counter and the collision counter are provided in every radio communication device correspondent node.

When the radio communication device which transmits data refers to the collision counter and detects the collisions of N or more frames in a certain period of time, the device transmits a transmittable time request frame before the next transmission to the radio communication device correspondent node with which the collisions occurred. In this frame, a time slot in which the radio communication device itself desires to perform transmission is written in the format of the RTS frame (the frame control is different from the RTS). When the receiving radio communication device receives the frame, it responds concerning the time slot in which reception is possible with a transmittable time response frame. The configuration of this frame is the same as the CTS frame, except that the frame control is different.

The transmitting radio communication device which has received the transmittable time response frame responds giving the time slots which are not prohibited, referring to its reservation prohibition table. In this way, the transmitting radio communication device already knows the time slot in which the RTS can be transmitted and therefore the collision of the reservation time does not occur.

Figure 19:
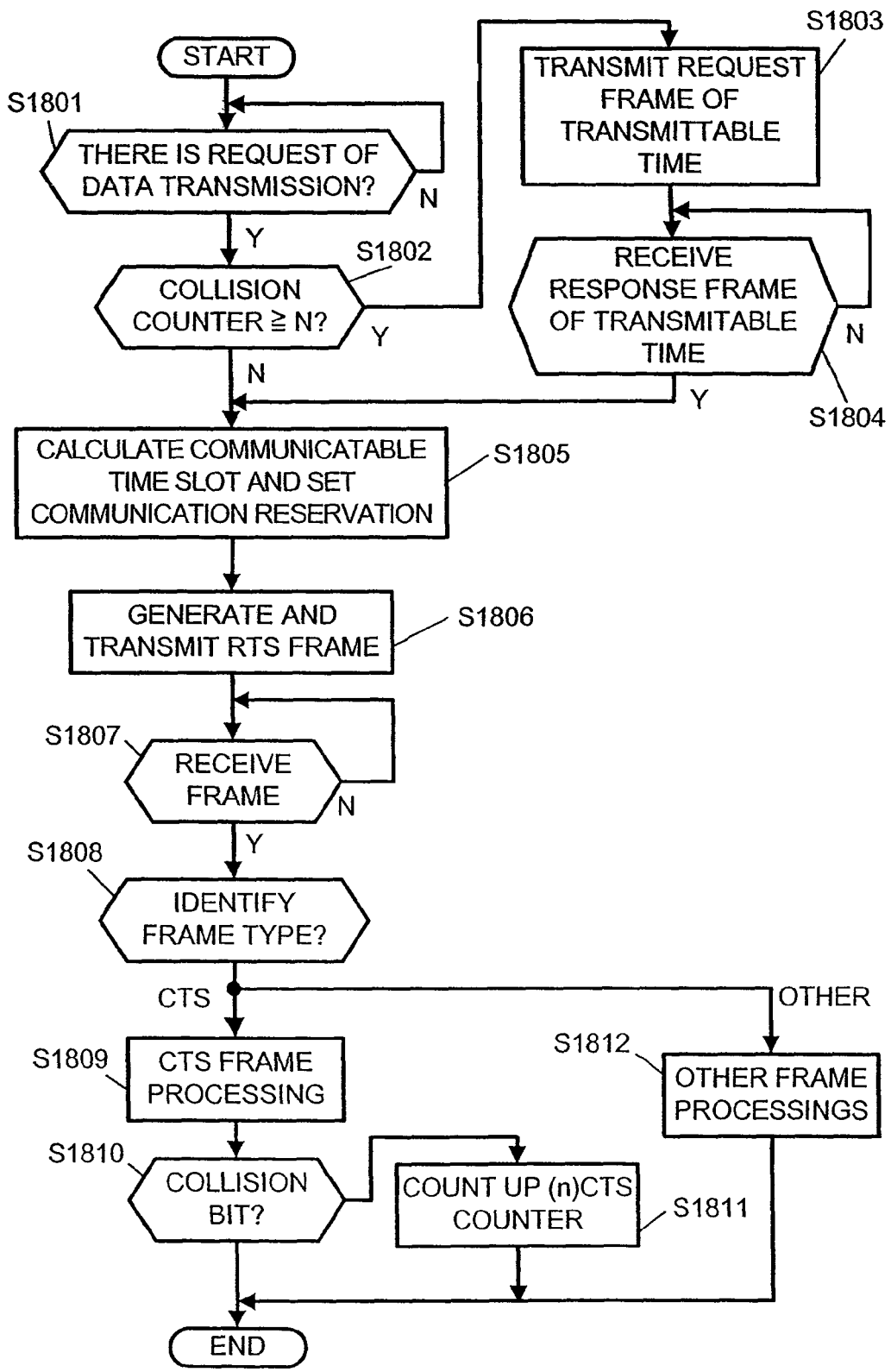
FIG. 19 is a flow chart showing an operation flow of a transmitting radio communication device according to an embodiment 5 of the invention.

An actual operation flow of the transmitting radio communication device is shown in FIG. 19.

In FIG. 19, first, when the communication data generation unit 210 receives a data transmission request from the application unit 203 (step S1801), the communication data generation unit 210 checks the collision counter 1501 (step S1802). The collision counter 1501 is counted up when data transmission fails if a collision bit is recorded in the CTS counter 1502. When the collision counter is more than or equal to the prescribed value, the communication data generation unit 210 transmits a transmittable time request frame to the correspondent node to which the data is to sent (step S1803).

According to this, when a transmittable time response frame is transmitted from the correspondent node radio communication device (step S1804), the communication information analysis unit 204 calculates the transmittable time during which data transmission is actually performed based on the transmittable time written in the transmittable time response frame (step S1805). Then, the communication data generation unit 210 generates and transmits the RTS frame according to the result (step S1806).

Next, when the receiving unit 201 receives the response frame (step S1807), the communication data selection unit 202 selects the frame type (step S1808). If the received frame is a CTS frame, the communication data selection unit 202 delivers the frame to the communication information analysis unit 204. The communication information analysis unit 204 performs the CTS frame processing (step S1809), then, counts up the CTS counter if the collision bit is set (step S1811). With the above operations, the processing of communication reservation is completed.

On the other hand, in the step S1808, when the frame type is other than the CTS frame, respective frame processings are performed (step S1812). Thus, the processing of communication reservation is completed.

In this manner, when the transmitting radio communication device fails to make a transmission repeatedly with a certain radio communication device correspondent node, they can be in a position relation of communication reservation collision. Consequently, before sending data, the transmitting radio communication device confirms the times which can be reserved with an RTS, based on the request frame of reservation-available time and the response frame of reservation-available time, and gives notification of the confirmed times when reservation can be made with an RTS frame, and as a result, the collision of communication reservation can be prevented.

INDUSTRIAL APPLICABILITY

The invention is a useful radio communication method and radio communication device when performing ad hoc communication and the like, suitable for avoiding communication collision with other radio communication devices.

The invention claimed is:
1. A radio communication method, comprising:
a step in which a first radio communication device transmits a communication time reservation request information requesting a time slot for transmitting data to a second radio communication device;

a step in which the second radio communication device transmits a communication time reservation response information confirming the reception of the communication time reservation request information, and indicating if the requested time slot is available;

a step in which a third radio communication device which has received the communication time reservation request information or the communication time reservation response information or both stores the requested time slot written in the communication time reservation request information or the communication time reservation response information as a transmission prohibited time slot;

a step in which the third radio communication device determines its own time slot in which its own transmission and reception are possible, based on the stored transmission prohibited time slots; and a step in which the first radio communication device transmits a continuation request information to the second radio communication device reserving a dedicated time slot following the requested time slot to transmit another communication time reservation request information to the second radio communication device.

2. The radio communication method according to claim 1, wherein the third radio communication device prohibits transmission in all time slots written in the stored communication time reservation request information or the communication time reservation response information.

3. The radio communication method according to claim 2, wherein the communication time reservation request information and the communication time reservation response information also includes the channel used for communication, in which even when the data-transmission dedicated time recorded in the communication prohibition table is the same, the communication time reservation request and the data transmission are possible if the channel whereby the first radio communication device performs transmission is different from information of communication prohibition table.

4. The radio communication method according to claim 2, wherein notice of the time slot is given in the form of a data-transmission start time and a data-transmission dedicated time.

5. The radio communication method according to claim 1, wherein notice of the time slot is given in the form of a data-transmission start time and a data-transmission dedicated time.

6. The radio communication method according to claim 1, wherein the first radio communication device transmits a communication request signal RTS including communication time reservation request information and the second radio communication device transmits a communication confirmation signal CTS including communication time reservation response information.

7. The radio communication method according to claim 1, further comprising:
a step in which the first radio communication device transmits data in the time slot of which the second radio communication device has been notified;
a step in which the second radio communication device detects collisions while receiving data;
a step in which the second radio communication device gives notice of the collision to the first radio communication device when the number of collisions is more than or equal to the prescribed number of times; and
a step in which when the first radio communication device receives the notification of collision, it transmits communication time reservation request information addressed to the second radio communication device, in which the time slot for transmitting data is set to be a time slot different from the previous one.

8. The radio communication method according to claim 7, wherein the second radio communication device detects that there has been a collision when data has not been received in a time slot where the transmission prohibited time slot calculated based on the received communication time reservation request information or the communication time reservation response information or both which are not addressed to it, and the time slot reserved for communication addressed to it overlap.

9. The radio communication method according to claim 1, further comprising:
a step in which the first radio communication device transmits data in the time slot of which the second radio communication device has been notified;
a step in which the second radio communication device detects collisions while receiving data;
a step in which the second radio communication device gives notice of the collision to the first radio communication device when the number of collisions per unit time is more than or equal to a prescribed number of times;
a step in which when the first radio communication device receives the notification of collision, it requests the second radio communication device to give the time slots in which transmission is prohibited or a time slot in which transmission is permitted;
a step in which when the second radio communication device receives the request, it transmits the transmission prohibited time slots or a transmission-permitted time slot to the first radio communication device; and
a step in which the first radio communication device selects a time slot which satisfies the conditions prescribed by the transmission prohibited time slots or the transmission-permitted time slot received from the second radio communication device and notifies the second radio communication device of the time slot as communication time reservation request information.

10. The radio communication method according to claim 9, wherein when the number of detected collisions is less than the prescribed number, the second radio communication device stops giving notice of its transmission prohibited time slots or its transmission-permitted time slot.

11. The radio communication method according to claim 9, wherein when the ratio between the transmission prohibited time slot and the transmission-permitted time slot is no more than the prescribed value, the second radio communication device stops giving notice of the transmission prohibited time slot or the transmission-permitted time slot to the first radio communication device.

12. The radio communication method according to claim 9, wherein the second radio communication device detects that there has been a collision when data has not been received in a time slot where the transmission prohibited time slot calculated based on the received communication time reservation request information or the communication time reservation response information or both which are not addressed to it, and the time slot reserved for communication addressed to it overlap.

13. The radio communication method according to claim 1, further comprising:
a step in which when the first radio communication device transmits the communication time reservation request information to the second radio communication device, the second radio communication device checks whether the information overlaps with communication time reservation request information received from another radio communication device as a third radio communication device;

a step in which when the second radio communication device detects a collision, it adds information indicating the overlap to the communication time reservation response information;

a step in which the first radio communication device transmits data to the second radio communication device;

a step in which when the first radio communication device detects information indicating an overlap and detects that a response to data is not returned, this constitutes detection of a collision;

a step in which when the number of collisions per unit time is more than or equal to the prescribed number, the first radio communication device inquires of the second radio communication device regarding the time when the first radio communication device does not collide; and a step in which the first radio communication device transmits information of communication time reservation in accordance with the notification of the collision-free time slot made in response to the inquiry from the second radio communication device.

14. The radio communication method according to claim 13, wherein the second radio communication device detects that there has been a collision when data has not been received in a time slot where the transmission prohibited time slot calculated based on the received communication time reservation request information or the communication time reservation response information or both which are not addressed to it, and the time slot reserved for communication addressed to it overlap.

15. The radio communication method according to claim 1, further comprising:

a step in which when the transmission prohibited time slot decided based on communication time reservation request information or communication time reservation response information or both which are not addressed to the second radio communication device overlaps with a time slot in which communication addressed to the second radio communication device is reserved, the second radio communication device forwards communication time reservation request information and communication time reservation response information which are not addressed to it and which are received from that time onward, to radio communication devices in the transmittable area.

16. The radio communication method according to claim 15, wherein the second radio communication device detects that there has been a collision when data has not been received in a time slot where the transmission prohibited time slot calculated based on the received communication time reservation request information or the communication time reservation response information or both which are not addressed to it, and the time slot reserved for communication addressed to it overlap.

17. The radio communication method according to claim 1, further comprising:

a step in which the first radio communication device transmits data in the time slot of which notice has been given to the second radio communication device;

a step in which the second radio communication device detects collisions while receiving data;

a step in which the second radio communication device gives notice of the collision and of the transmission prohibited time slots or a transmission permitted time slot to the first radio communication device; and a step in which when the first radio communication device receives the collision notification, it selects a time slot which satisfies the conditions prescribed by the transmission prohibited time slots or the transmission-permitted time slot received from the second radio communication device and gives notice of the time slot satisfying the conditions to the second radio communication device as communication time reservation request information.

18. The radio communication method according to claim 17, wherein the second radio communication device detects that there has been a collision when data has not been received in a time slot where the transmission prohibited time slot calculated based on the received communication time reservation request information or the communication time reservation response information or both which are not addressed to it, and the time slot reserved for communication addressed to it overlap.

19. The radio communication method according to claim 1, wherein the continuation request information reserves another dedicated time slot following the requested time slot to transmit another communication time reservation response information from the second radio communication device to the first radio communication device.

20. A radio communication device, comprising:

a receiving unit receiving radio communication data from a source radio communication device;

a communication data identification unit identifying if the radio communication data includes a communication time reservation request information requesting a time slot when the source radio communication device will transmit data, and if the radio communication data includes a continuation request information reserving a dedicated time slot following the time slot when the source radio communication device will transmit another reservation request information to the radio communication device;

a communication information analysis unit extracting an identifier of the source radio communication device and the data transmission reservation time slot from the communication time reservation request information of the identified radio communication data or the continuation request information for the data transmission, a communication reservation table in which the communication information analysis unit records the identifier and reservation time slot, associating them with one another, when the destination of the radio communication data is the receiving radio communication device;

a response information generation unit generating communication time reservation response information confirming or denying the requested time slot; and a transmitting unit transmitting the generated communication time reservation response information to the source radio communication device.

21. The radio communication device according to claim 20, further comprising:

a communication prohibition table in which the communication information analysis unit records the identifier, the reservation time slot and the destination, associating them with one another, when the radio communication device is not the destination of the radio communication data, and wherein the response information generation unit generates communication time reservation response information to which the notice of communication prohibition is added when the received radio communication data addressed to it requests to reserve communication in a time slot which overlaps with a time slot recorded in the communication prohibition table.

22. The radio communication device according to claim 21, further comprising:
a communication data generation unit generating transmission data addressed to another radio communication device; and
a communication information generation unit generating communication time reservation request information including a transmission time slot, deciding on a time slot other than time slots recorded in the communication prohibition table as the transmission time slot for transmission of data generated by the communication data generation unit, and
wherein said transmitting unit transmits the communication time reservation request information to a destination radio communication device.

23. The radio communication device according to claim 22, further comprising:
an event timer, which notifies the communication data generation unit that the transmission time has elapsed when it receives the notification of the transmission time from the communication information generation unit, and
wherein when the communication data generation unit receives the notification, it generates communication data and transmits the data to the destination radio communication device.

24. The radio communication device according to claim 21, wherein the communication time reservation request information and the communication time reservation response information further includes information of a channel used for communication, and
wherein even when a time slot of data transmission recorded in the communication prohibition table by the communication information analysis unit is the same, the communication time reservation request and data transmission are possible when the channel by which the first radio communication device performs transmission is different from the information of the communication prohibition table.

* * * * *

UNITED STATES PATENT AND TRADEMARK OFFICE
CERTIFICATE OF CORRECTION

| | | |
|---|---|---|
| PATENT NO. | : 8,081,651 B2 | Page 1 of 1 |
| APPLICATION NO. | : 12/561710 | |
| DATED | : December 20, 2011 | |
| INVENTOR(S) | : Hiroshi Doi et al. | |

It is certified that error appears in the above-identified patent and that said Letters Patent is hereby corrected as shown below:

On the Title Page, FIELD [63], Related U.S. Application Data:

"Continuation of application No. 10/574,595, filed on Apr. 5, 2006, now Pat. No. 7,613,202" should read --Continuation of application No. 10/574,595, filed on Apr. 5, 2006, filed as application No. PCT/JP2005/009848 on May 30, 2005, now Pat. No. 7,613,202--.

Signed and Sealed this
Seventeenth Day of April, 2012

David J. Kappos
*Director of the United States Patent and Trademark Office*